(12) United States Patent
Morikawa et al.

(10) Patent No.: US 7,300,980 B2
(45) Date of Patent: Nov. 27, 2007

(54) THERMOPLASTIC ELASTOMER COMPOSITION AND PROCESS FOR PRODUCING THE SAME

(75) Inventors: Akihiko Morikawa, Mie (JP); Kentarou Kanae, Mie (JP); Hideo Nakanishi, Mie (JP); Minoru Maeda, Mie (JP); Takahiro Okamoto, Tokyo (JP)

(73) Assignee: JSR Corporation, Tokyo (JP)

( * ) Notice: Subject to any disclaimer, the term of this patent is extended or adjusted under 35 U.S.C. 154(b) by 162 days.

(21) Appl. No.: 10/489,312

(22) PCT Filed: Jun. 27, 2002

(86) PCT No.: PCT/JP02/06522

§ 371 (c)(1),
(2), (4) Date: Sep. 28, 2004

(87) PCT Pub. No.: WO03/025055

PCT Pub. Date: Mar. 27, 2003

(65) Prior Publication Data

US 2005/0038186 A1 Feb. 17, 2005

(30) Foreign Application Priority Data

Sep. 18, 2001 (JP) .............................. 2001-283462
Dec. 4, 2001 (JP) .............................. 2001-369528

(51) Int. Cl.
C08F 8/00 (2006.01)
C08L 33/02 (2006.01)
C08L 33/04 (2006.01)
C08L 35/02 (2006.01)
C08K 5/00 (2006.01)

(52) U.S. Cl. ............... 525/191; 525/194; 525/221; 525/222; 524/500; 524/515

(58) Field of Classification Search ............... 525/191, 525/194, 221, 222; 524/500, 515
See application file for complete search history.

(56) References Cited

U.S. PATENT DOCUMENTS 5,677,382 A    10/1997   Tsuji et al.
5,691,413 A    11/1997   Morikawa et al.
5,914,372 A     6/1999   Hasegawa et al.
6,087,431 A *   7/2000   Uchida et al. ............... 524/490
6,384,143 B1*   5/2002   Nishihara et al. ........... 525/191
6,417,271 B1*   7/2002   Nishihara et al. ........... 525/105
6,670,426 B2   12/2003   Kanae et al.
6,696,516 B2    2/2004   Morikawa et al.

FOREIGN PATENT DOCUMENTS

| JP | 58-2338 | 1/1983 |
| JP | 59-221347 | 12/1984 |
| JP | 61-247747 | 11/1986 |
| JP | 62-199639 | 9/1987 |
| JP | 3-64341 | 3/1991 |
| JP | 4-114045 | 4/1992 |
| JP | 2000-026668 | 1/2000 |
| JP | 2000-095900 | 4/2000 |
| JP | 2000-143884 | 5/2000 |

OTHER PUBLICATIONS

U.S. Appl. No. 08/654,218, filed May 28, 1996, Mori, et al.
U.S. Appl. No. 09/487,628, filed Jan. 20, 2000, Kodama, et al.
U.S. Appl. No. 09/926,426, filed Jan. 14, 2002, Morikawa, et al.
U.S. Appl. No. 10/381,439, filed Mar. 31, 2003, Kurihara, et al.
U.S. Appl. No. 10/487,244, filed Feb. 27, 2004, Abe, et al.
U.S. Appl. No. 10/505,882, filed Sep. 3, 2004, Kanae, et al.

* cited by examiner

*Primary Examiner*—Nathan M. Nutter
(74) *Attorney, Agent, or Firm*—Oblon, Spivak, McClelland, Maier & Neustadt, P.C.

(57) ABSTRACT

A thermoplastic elastomer composition of the invention, formed by dynamically crosslinking a polymer composition including a rubber and an olefinic resin and having an average particle size of rubber particles within a specific range, shows an excellent balance of mechanical properties such as flexibility and elastic recovery, and a moldability. Also an inclusion of a (meth)acrylate resin and a hydrogenated diene polymer provides a composition particularly excellent in scratch resistance. Also an inclusion of a maleimide compound provides a composition particularly excellent in injection fusibility. Also an inclusion of an undenatured organopolysiloxane of a specific viscosity and a denatured organopolysiloxane provides a composition particularly excellent in initial slidability and durable slidability.

5 Claims, No Drawings

THERMOPLASTIC ELASTOMER COMPOSITION AND PROCESS FOR PRODUCING THE SAME

TECHNICAL FIELD

The present invention relates to a thermoplastic elastomer composition and a method for producing the same. More specifically, it relates to a thermoplastic elastomer composition having an excellent balance of mechanical characteristics such as flexibility and elastic recovery, and a moldability, and a method for producing the same. It also relates to a thermoplastic elastomer composition excellent in flexibility, scratch resistance, mechanical characteristics and rubber elasticity and a method for producing the same. It further relates to a thermoplastic elastomer composition excellent in injection fusibility and a method for producing the same. It further relates to a thermoplastic elastomer composition excellent in initial slidability, durable slidability, abrasion resistance, thermal fusibility and moldability, and being satisfactory in external appearance and touch of a molded article, and a method for producing the same.

BACKGROUND TECHNOLOGY

A thermoplastic elastomer composition, formed by a dynamically heat treating of a rubber and an olefinic resin in the presence of a crosslinking agent, does not require a vulcanizing step and can be easily formed into a molded article by an ordinary molding method for a thermoplastic resin, such as injection molding, profile extrusion molding, calendering or blow molding.

However, such dynamically crosslinked olefinic thermoplastic elastomer is inferior in elastic recovering property to a vulcanized rubber. For improving such elastic recovering property, there have been investigated an increase in the crosslinking density and a higher Mooney viscosity in the rubber. These methods improve the elastic recovery but the thermoplastic elastomer composition loses fluidity significantly. Also in order to improve the moldability, there can be employed a method of adding a peroxide-decomposable olefinic rubber, but such method is associated with a drawback that the elastic recovering property is deteriorated. It has thus not been easy, in the prior technologies, to obtain a thermoplastic elastomer composition in which the elastic recovery and the moldability are well balanced.

Also in recent years, thermoplastic elastomers which are a rubber-like soft material not requiring a vulcanizing process and having a moldability similar to that of thermoplastic resins are attracting attention and used in various fields such as automotive parts, parts for consumer electric appliances, parts for medical and food instruments, electric wires, and household goods. In such thermoplastic elastomers, those of polyolefin type, polystyrene type, polyurethane type, polyester type, polyvinyl chloride type or the like. have been developed and commercialized. Among these, particularly useful are a blend employing an olefinic resin and an ethylene•α-olefine random copolymer rubber as principal raw materials, and an olefinic dynamically crosslinked thermoplastic elastomer employing an olefinic resin and an ethylene•α-olefine random copolymer rubber as principal raw materials and partially crosslinked with a crosslinking agent. These materials have excellent heat resistance, weather resistance, cold resistance and moldability, and are relatively inexpensive. For these reasons, these materials are attracting attention, particularly in automotive parts or the like, as a replacement of metal parts for the purpose of a weight reduction, a replacement for RIM urethane parts for the purposes of an improvement in the service life of the parts and for a cost reduction, a replacement for vulcanized rubber for the purposes of simplification of working process, recyclability and a cost reduction and a replacement for soft polyvinyl chloride for the purpose of an improvement in the service life and an improvement in contamination, and consumption of these materials is increasing year after year.

However the olefinic dynamically crosslinked thermoplastic elastomer is inferior in a surface scratch resistance (scratch resistance), and is still insufficient for use in molded articles requiring scratch resistance, such as an inner panel or a surface material of a console box.

Also the olefinic dynamically crosslinked thermoplastic elastomer is excellent in heat resistance, ozone resistance and weather resistance, also has a rubber elasticity similar to that of vulcanized rubber, and also has a moldability almost comparable to olefinic thermoplastic resins such as polyethylene or polypropylene. Utilizing these properties, it is employed in molded products requiring rubber elasticity such as a bumper, an external lace, a window sealing gasket, a door sealing gasket, a trunk sealing gasket, a roof siderail, an emblem, an internal surface finishing material or the like. for an automobile. It is also employed in various gaskets for construction use. Among these, the olefinic dynamically crosslinked thermoplastic elastomer used in the applications particularly requiring rubber elasticity such as automotive gaskets for window sealing, door sealing, trunk sealing or the like, and gaskets for construction purpose can be obtained by increasing the content of the ethylene•α-olefine copolymer rubber component in comparison with the olefinic dynamically crosslinked thermoplastic elastomer employed in other applications.

However, the olefinic dynamically crosslinked thermoplastic elastomer obtained in this manner has a low fluidity at the molding, and it is difficult to directly produce an automotive gasket or a construction gasket of a complex shape by injection molding. On the other hand, a prior process for molding such gaskets is complex and requires a long work time as explained in the following, and an improvement is strongly desired for work saving and for improving productivity.

For molding a gasket, for example in case of ordinary vulcanized rubber, there has been employed a process of forming a linear portion of the gasket by a profile extrusion molding of unvulcanized rubber, then vulcanizing the article produced by profile extrusion molding, and adding and vulcanizing a curved adjoining portion between ends of such molded articles in slit molds thereby forming a connecting part. However, such process requires the vulcanizing step twice. In order to simplify such process and reduce the work time, there are conceived a method of replacing the adjoining portion between the ends of the profile extruded and vulcanized articles by an olefinic dynamically crosslinked thermoplastic elastomer not requiring vulcanization and a method of replacing also the profile extruded articles of the linear portions with an olefinic dynamically crosslinked thermoplastic elastomer, and the former method is considered desirable practically. In such method of replacing the adjoining portion between the ends of the profile extruded and vulcanized articles by the olefinic dynamically crosslinked thermoplastic elastomer, there is adopted a method of placing profile extruded articles in a split mold and injecting an olefinic dynamically crosslinked thermoplastic elastomer in an adjoining portion thereby fusing the end portions. However, in most cases, it is difficult to obtain a fusion with a practically acceptable adhesion strength. For example, JP-B-61-53933 proposes a method, in mutually adjoining extrusion molded articles of an olefinic dynamically crosslinked thermoplastic elastomer, of preheating the articles to be adjoined thereby improving the adhesion strength. Also JP-A-59-221347 proposes a method, in a similar adjoining, of employing an olefinic dynamically crosslinked thermoplastic elastomer containing crystalline poly-1-butene thereby improving the adhesion strength even without preheating. However, in these methods, a sufficient effect cannot be obtained particularly in case the member to be adjoined is olefinic vulcanized rubber. Consequently there is strongly desired a development of an olefinic composition thermoplastic elastomer composition showing an excellent injection fusibility for an olefinic vulcanized rubber and an olefinic dynamically crosslinked thermoplastic elastomer as the material to be adjoined.

Furthermore, the olefinic dynamically crosslinked thermoplastic elastomer, having a flexibility and excellent rubber-like properties and not requiring a vulcanizing step, can produce a molded article by a molding method for ordinary thermoplastic resins such as injection molding, profile extrusion molding, calendering, or blow molding. For this reason, it is recently used increasingly, in view of energy saving, resource saving and recyclability, in automotive parts, industrial products, electric and electronic parts, construction materials or the like. as a replacement for vulcanized rubber or vinyl chloride resin.

However, in automotive parts such as a glass run channel or a window lace, it is associated with drawbacks of a low slidability to a window pane and a low durability.

For improving the slidability, JP-A-2000-26668 discloses an olefinic thermoplastic elastomer composition prepared by adding organopolysiloxane and an aliphatic amide to an olefinic dynamically crosslinked thermoplastic elastomer. Also JP-A-2000-143884 discloses an olefinic thermoplastic elastomer composition formed by adding acryl-denatured organopolysiloxane and a higher fatty acid or a higher fatty acid amide to an olefinic dynamically crosslinked thermoplastic elastomer or employing these in combination.

However, either composition shows an insufficient slidability, and also has a drawback that the appearance becomes defective because of bleeding out of aliphatic acid amide.

Furthermore, JP-A-2000-959000 discloses an olefinic thermoplastic elastomer formed by adding organopolysiloxane of a viscosity of 10 cSt or higher but less than $10^6$ cSt, organopolysiloxane of a viscosity of $10^6$ to $10^8$ cSt and a fluorinated polymer to an olefinic dynamically crosslinked thermoplastic elastomer.

However, though a high content of organopolysiloxane provides a satisfactory slidability, organopolysiloxane showing a low mutual solubility with the olefinic dynamically crosslinked thermoplastic elastomer causes bleeding out, thereby providing an unpleasant sticky feeling when the surface is touched, and there is strongly desired the development of an olefinic dynamically crosslinked thermoplastic elastomer free from bleeding-out phenomenon and showing excellent slidability.

SUMMARY OF THE INVENTION

The present invention has been made in consideration of the aforementioned situation and is to provide a thermoplastic elastomer composition having an excellent balance of mechanical properties such as flexibility and elastic recovery, and a moldability, and a method for producing the same.

Another object of the invention is to provide a thermoplastic elastomer composition having features of prior olefinic dynamically crosslinked thermoplastic elastomers and excellent in a scratch resistance, and a method for producing the same.

Still another object of the invention is to provide a thermoplastic elastomer composition having an excellent injection fusibility, showing a high adhesion strength to a member to be adhered constituted of an olefinic vulcanized rubber or a member to be adhered constituted of an olefinic dynamically crosslinked thermoplastic elastomer, and adapted for use requiring an improved surface scratch resistance and particularly requiring thermal fusion, and a method for producing the same.

Still another object of the invention is to provide a thermoplastic elastomer composition excellent in an initial slidability, a durable slidability, an abrasion resistance, a thermal fusibility and a moldability, and providing a satisfactory appearance and a satisfactory touch in a molded article, and a method for producing the same.

The invention is summarized in the following:

1. A thermoplastic elastomer composition formed by dynamically heat treating, in the presence of a crosslinking agent, a polymer composition including a rubber and an olefinic resin;
   wherein the rubber included in the thermoplastic elastomer composition has a gel fraction of 80% or higher, and rubber particles contained in the thermoplastic elastomer composition has a number-averaged particle size (dn) equal to or less than 3 μm and a ratio (dv/dn) of a volume-averaged particle size (dv) to the number-averaged particle size (dn) equal to or less than 1.5.

2. A thermoplastic elastomer composition according to the foregoing 1, wherein the gel fraction is 95% or higher and the dn is 2 μm or less.

3. A thermoplastic elastomer composition according to the foregoing 1, wherein, for a sum of the rubber and the olefinic resin taken as 100 parts by mass, the rubber is present at a level of 20 to 95 parts by mass, the olefinic resin is present at a level of 5 to 80 parts by mass, and the crosslinking agent is present at a level of 0.05 to 10 parts by mass.

4. A thermoplastic elastomer composition according to the foregoing 1, wherein the rubber is an ethylene•α-olefin copolymer rubber, and the ethylene•α-olefin copolymer rubber has a limiting viscosity [η] of 2.0 to 6.8 dl/g when measured at 135° C. in decaline as a solvent.

5. A thermoplastic elastomer composition formed by dynamically heat treating, in the presence of a crosslinking agent, a polymer composition including a rubber, an olefinic resin, a (meth)acrylate resin and a hydrogenated diene polymer.

6. A thermoplastic elastomer composition according to the foregoing 5, wherein the hydrogenated diene polymer is formed by hydrogenation of a copolymer having a polymer block principally formed by a vinyl aromatic unit and a polymer block principally formed by a conjugate diene unit.

7. A thermoplastic elastomer composition according to the foregoing 5, wherein, for a sum of the rubber, the olefinic resin, the (meth)acrylate resin and the hydrogenated diene polymer taken as 100 mass %, the rubber is present at a level of 20 to 95 mass %, the olefinic resin is present at a level of 3 to 70 mass %, the (meth)acrylate resin is present at a level of 1 to 20 mass %, and the hydrogenated diene polymer is present at a level of 1 to 10 mass %.

8. A thermoplastic elastomer composition according to the foregoing 5, wherein the rubber is an ethylene•α-olefin copolymer rubber, and the ethylene•α-olefin copolymer rubber has a limiting viscosity [η] of 2.0 to 6.8 dl/g when measured at 135° C. in decaline as a solvent.

9. A thermoplastic elastomer composition formed by dynamically heat treating, in the presence of a crosslinking agent, a polymer composition including a rubber, an olefinic resin, a softening agent and a maleimide compound, in which, for a sum of the rubber, the olefinic resin and the softening agent taken as 100 mass %, the olefinic resin is present at a level of 5 to 36 mass %, and for a sum of the rubber, the olefinic resin and the softening agent taken as 100 parts by mass, the maleimide compound is present at a level of 0.3 to 10 parts by mass.

10. A thermoplastic elastomer composition according to the foregoing 9, wherein, for a sum of the rubber, the olefinic resin and the softening agent taken as 100 mass %, the rubber is present at a level of 20 to 85 mass % and the softening agent is present at a level of 10 to 75 mass %.

11. A thermoplastic elastomer composition characterized by being formed by dynamically heat treating, in the presence of a crosslinking agent, a polymer composition including a rubber, an olefinic resin, a softening agent, a (meth)acrylate resin, and a maleimide compound, wherein for a sum of the rubber, the olefinic resin and the softening agent taken as 100 parts by mass, the maleimide compound is present at a level of 0.3 to 10 parts by mass and the (meth)acrylate resin is present at a level of 1 to 30 parts by mass.

12. A thermoplastic elastomer composition according to the foregoing 11, further including a hydrogenated diene polymer, wherein the hydrogenated diene polymer is present at a level of 0.1 to 1 in a mass ratio to the (meth))acrylate resin.

13. A thermoplastic elastomer composition characterized by being formed by dynamically heat treating, in the presence of a crosslinking agent, a polymer composition including an ethylene•α-olefin copolymer rubber which has a limiting viscosity [η] of 2.0 to 6.8 dl/g when measured at 135° C. in decaline as a solvent, an olefinic resin, a softening agent and a maleimide compound, wherein, for a sum of the rubber, the olefinic resin and the softening agent taken as 100 parts by mass, the maleimide compound is present at a level of 0.3 to 10 parts by mass.

14. A thermoplastic elastomer composition formed by dynamically heat treating, in the presence of a crosslinking agent, a polymer composition including a rubber, an olefinic resin, a softening agent, a low-viscosity undenatured organopolysiloxane having a viscosity measured at 25° C. according to JIS K2283 less than 10,000 cSt, a high-viscosity undenatured organopolysiloxane having a viscosity measured at 25° C. according to JIS K2283 equal to or higher than 10,000 cSt, and a denatured organopolysiloxane.

15. A thermoplastic elastomer composition according to the foregoing 14, wherein, for a sum of the rubber, the olefinic resin and the softening agent taken as 100 parts by mass, the rubber is present at a level of 20 to 69 parts by mass, the olefinic resin is present at a level of 1 to 50 parts by mass, and the softening agent is present at a level of 20 to 79 parts by mass.

16. A thermoplastic elastomer composition according to the foregoing 14, wherein, for a sum of the rubber, the olefinic resin and the softening agent taken as 100 parts by mass, the low-viscosity undenatured organopolysiloxane is present at a level of 1 to 10 parts by mass, the high-viscosity undenatured organopolysiloxane is present at a level of 1 to 10 parts by mass, and the denatured organopolysiloxane is present at a level of 0.2 to 20 mass %.

17. A thermoplastic elastomer composition formed by dynamically heat treating, in the presence of a crosslinking agent, a polymer composition including an oil-extended rubber including a rubber and a softening agent in which, for a sum of the rubber and the softening agent taken as 100 mass %, the rubber is present at a level of 30 to 70 mass % and the softening agent is present at a level of 30 to 70 mass %, an olefinic resin, a post-addition softening agent which is added when required, an undenatured organopolysiloxane having a viscosity measured at 25° C. according to JIS K2283 less than 10,000 cSt, an undenatured organopolysiloxane having a viscosity measured at 25° C. according to JIS K2283 equal to or higher than 10,000 cSt, and a denatured organopolysiloxane.

18. A thermoplastic elastomer composition according to the foregoing 17, wherein, for a sum of the oil-extended rubber, the olefinic resin and the post-addition softening agent taken as 100 parts by mass, the oil-extended rubber is present at a level of 30 to 99 parts by mass, the olefinic resin is present at a level of 1 to 50 parts by mass, and the post-addition softening agent is present at a level of 50 parts by mass or less (including 0 parts by mass).

19. A thermoplastic elastomer composition according to the foregoing 17, wherein, for a sum of the oil-extended rubber, the olefinic resin and the post-addition softening agent taken as 100 parts by mass, the low-viscosity undenatured organopolysiloxane is present at a level of 1 to 10 parts by mass, the high-viscosity undenatured organopolysiloxane is present at a level of 1 to 10 parts by mass, and the denatured organopolysiloxane is present at a level of 0.2 to 20 mass %.

20. A thermoplastic elastomer composition according to the foregoing 14 or 17, wherein the rubber is an ethylene•α-olefin copolymer rubber, and the ethylene•α-olefin copolymer rubber has a limiting viscosity [η] of 2.0 to 6.8 dl/g when measured at 135° C. in decaline as a solvent.

21. A method for producing a thermoplastic elastomer composition characterized in melt kneading a polymer composition including a rubber and an olefinic resin, and other additives excluding a crosslinking agent or a part of the crosslinking agent, or a polymer composition including a rubber and an olefinic resin, a crosslinking agent and other additives, in a closed kneader to obtain a melted blended substance, and then supplying the melted blended substance or the melted blended substance and the crosslinking agent to a continuous extruder thereby executing dynamically heat-treating.

22. A method for producing a thermoplastic elastomer composition characterized in adding a crosslinking agent to a polymer composition containing a rubber and an olefinic resin, and then supplying the mixture to plural connected continuous kneaders thereby executing dynamically heat-treating.

23. A method for producing a thermoplastic elastomer composition characterized in supplying a polymer composition including a rubber and an olefinic resin to an extrusion apparatus constituted of a serial connection of an upstream continuous two-shaft kneader with different rotating directions and a downstream two-shaft extruder with a same rotating direction, from a raw material introducing part of the continuous two-shaft kneader with different rotating directions thereby kneading the polymer composition in the continuous two-shaft kneader with different rotating directions, and supplying the kneaded substance to the two-shaft extruder with a same rotating direction with a temperature of the kneaded substance maintained at 250° C. or less at an exit of the continuous two-shaft kneader with different rotating directions thereby executing a dynamic crosslinking.

24. A method for producing a thermoplastic elastomer composition characterized in supplying a polymer composition including a rubber, an olefinic resin and an organic peroxide having a 1-minute half-period temperature $T_h$ (° C.) within a range of $T_m \leq T_h \leq T_m + 50$ (° C.) in which $T_m$ is a melting point (° C.) of the olefinic resin, to an extrusion apparatus constituted of a serial connection of an upstream continuous two-shaft kneader with different rotating directions and a downstream two-shaft extruder with a same rotating direction, from a raw material introducing part of the continuous two-shaft kneader with different rotating directions thereby kneading the polymer composition in the continuous two-shaft kneader with different rotating directions, and supplying the kneaded substance to the two-shaft extruder with a same rotating direction with a temperature ($t_a$) of the kneaded substance maintained within a range of $T_h - 30 \leq t_a \leq T_h + 30$ (° C.) at an exit of the continuous two-shaft kneader with different rotating directions thereby executing a dynamic crosslinking.

The present invention provides following effects.

According to the invention, a polymer composition formed by a rubber, an olefinic resin or the like. is dynamically crosslinked to obtain a thermoplastic elastomer composition having an excellent balance of mechanical properties such as flexiblity and elastic recovery, and a moldability. Such composition enables easy working with injection molding, extrusion molding, blow molding, compression molding, vacuum molding, laminate molding or calender molding.

Also the olefinic thermoplastic elastomer composition can be made particularly excellent in scratch resistance, and is useful in applications in which the prior olefinic thermoplastic elastomer is employed, particularly in molded parts such as automotive indoor and outdoor parts such as a weather strip, a sponge or a lace, or a housing for a consumer electric appliances, and a leather sheet product requiring a scratch resistance.

It can also be made excellent in an injection fusibility, and is widely applicable not only to various composite worked products having an injection fused portion but also to ordinary worked products. It is useful, for example, to automotive indoor and outdoor surface materials such as a bumper, an external lace, a window sealing gasket, a door sealing gasket, a trunk sealing gasket, a roof side rail, or an emblem, a sealing material or an indoor or outdoor surface material for an aircraft or a ship, a sealing material, an indoor or outdoor surface material or a waterproof sheet for construction or building, a sealing material for machinery and apparatuses, a packing or a housing for consumer electric appliances, household goods and sporting goods.

It can further be made a thermoplastic elastomer composition excellent in initial slidability, durabable slidability and abrasion resistance and satisfactory in external appearance and touch of the molded article, and is useful for automotive parts such as a glass run channel or a window lace.

DISCLOSURE OF THE INVENTION

[1] A Thermoplastic Elastomer Composition Including Rubber Particles of a Specific Particle Size The thermoplastic elastomer composition of the present invention is characterized in being formed by dynamically heat-treating, in the presence of a crosslinking agent, of a polymer composition including a rubber and an olefinic resin. In particular, it is a thermoplastic elastomer composition formed by dynamically heat treating, in the presence of a crosslinking agent, a polymer composition including a rubber and an olefinic resin (such composition being hereinafter called a "specific-sized rubber particle-containing composition [A]"), wherein the rubber included in the specific-sized rubber particle-containing composition [A] has a gel fraction of 80% or higher, and rubber particles contained in the specific-sized rubber particle-containing composition [A] has a number-averaged particle size (dn) equal to or less than 3 μm and a ratio (dv/dn) of a volume-averaged particle size (dv) to the number-averaged particle size (dn) equal to or less than 1.5.

(1) Rubber

1) Type of Rubber

The rubber is not particularly restricted, and can for example be isoprene rubber, butadiene rubber, styrene-butadiene rubber, natural rubber, chloroprene rubber, butyl rubber, nitrile rubber, hydrogenated nitrile rubber, norbornene rubber, ethylene•α-olefinic copolymer rubber, acryl rubber, ethylene-acrylate rubber, fluorinated rubber, chlorosulfonated polyethylene rubber, epichlorohydrine rubber, silicone rubber, urethane rubber, polysulfide rubber, phosphazene rubber, or 1,2-polybutadiene. Among these, ethylene•α-olefinic copolymer rubber is preferable. Such rubber may be employed singly, or in a combination of two or more kinds.

2) Ethylene•α-olefinic Copolymer Rubber

The ethylene•α-olefinic copolymer rubber (hereinafter also simply called "copolymer rubber") includes an ethylene unit and an α-olefin unit, other than ethylene, as principal constituent units. In case the entire copolymer rubber is taken as 100 mol %, it is preferred that a sum of the ethylene unit and the α-olefin unit represents 90 mol % or higher.

α-olefin to be employed in the preparation of the copolymer rubber can be an α-olefin with 3 to 12 carbon atoms such as propene (hereinafter called "propylene"), 1-butene, 1-pentene, 3-methyl-1-butene, 1-hexene, 3-methyl-1-pentene, 4-methyl-1-pentene, 3-ethyl-1-pentene, 1-octene, 1-decene or 1-undecene. Among these, propylene and 1-butene are preferred. These may be employed singly or in a combination of two or more kinds.

As another monomer, there can be employed a non-conjugate diene. Examples of such non-conjugate diene include 1,4-pentadiene, 1,4-hexadiene, 1,5-hexadiene, 1,7-octadiene, 1,9-decadiene, 3,6-dimethyl-1,7-octadiene, 4,5-dimethyl-1,7-octadiene, 5-methyl-1,8-nonadiene, dicyclopentadiene, 5-ethylidene-2-norbornene, 5-vinyl-2-norbornene, and 2,5-norbornadiene. Among these, dicyclopentadiene and 5-ethylidene-2-norbornene are particularly preferred. These may be employed singly or in a combination of two or more kinds.

As the copolymer rubber, there is preferred an ethylene•α-olefinic binary copolymer rubber or an ethylene•α-olefinic•non-conjugate diene ternary copolymer rubber. As the ethylene•α-olefinic binary copolymer rubber, there is often employed ethylene•propylene copolymer rubber and ethylene•1-butene copolymer rubber. In such copolymer rubber, an ethylene content, for the entire copolymer rubber taken as 100 mol %, is preferably from 50 to 95 mol %, particularly preferably from 60 to 90 mol %.

Also as the ethylene•α-olefinic•non-conjugate diene ternary copolymer rubber, there is often employed ethylene•propylene•dicyclopentadiene ternary copolymer rubber, ethylene•propylene•5-ethylidene-2-norbornene ternary copolymer rubber, ethylene•1-butene•dicyclopentadiene ternary copolymer rubber, or ethylene•1-butene•5-ethylidene-2-norbornene ternary copolymer rubber. In such copolymer rubber, an ethylene content, for a sum of the ethylene unit and the propylene unit or the 1-butene unit taken as 100 mol %, is preferably from 50 to 95 mol %, particularly preferably from 60 to 90 mol %. Also content of dicyclopentadiene or 5-ethylidene-2-norbornene, for a sum of the ethylene unit and the propylene unit or the 1-butene unit taken as 100 mol %, is preferably from 3 to 10 mol %, particularly preferably from 3 to 8 mol %.

A content of the ethylene unit less than 50 mol % in the copolymer rubber tends to reduce the crosslinking efficiency (particularly in case an organic peroxide is used as a crosslinking agent), possibly being unable to obtain a copolymer rubber with sufficient physical properties. On the other hand, an ethylene content exceeding 95 mol % may undesirably reduce the flexibility of the copolymer rubber.

Also the ethylene•α-olefinic copolymer rubber preferably has a limiting viscosity [η] measured at 135° C. in decaline equal to or higher than 1.0 dl/g, preferably from 2.0 to 6.8 dl/g, particularly preferably from 3.5 to 6.8 dl/g and further preferably from 4.5 to 6.0 dl/g. A limiting viscosity less than 2.0 dl/g may reduce the elastic recovery. On the other hand, a limiting viscosity exceeding 6.8 dl/g may undesirably reduce the workability of the molded article.

As the copolymer rubber, in addition to the ethylene•α-olefinic binary copolymer rubber and the ethylene•α-olefinic-non-conjugate diene ternary copolymer rubber, there may also be employed a halogenated copolymer rubber formed by substituting a part of hydrogen atoms of such copolymer rubbers with a halogen atom such as a chlorine atom or a bromine atom. It is also possible to employ a graft copolymer rubber formed by graft polymerizing a monomer for example a (meth)acrylic acid derivative such as vinyl chloride, vinyl acetate, (meth)acrylic acid, methyl (meth)acrylate, glycidyl (meth)acrylate or (meth)acrylamide, a maleic acid derivative such as maleic acid, maleic anhydride, maleimide, or dimethyl maleate, or a conjugate diene such as butadiene, isoprene or chloroprene with the binary copolymer rubber, the ternary copolymer rubber or the halogenated copolymer rubber. Each of such halogenated copolymer rubber and graft copolymer rubber may be employed singly or in a combination of two or more kinds, or the halogenated copolymer rubber and the graft copolymer rubber may be employed in combination.

The copolymer rubber can be prepared by a polymerization method under a medium or low pressure, for example a method of polymerization in the presence of a catalyst constituted of a Ziegler-Natta catalyst, a soluble vanadium compound and an organic aluminum compound added in a solvent, by supplying ethylene, α-olefin and a non-conjugate diene in case of a ternary copolymer rubber, and hydrogen as a molecular weight regulating agent if necessary. Such polymerization can be executed for example by a gaseous method such as a fluidized bed method or an agitated bed method, or a liquid method such as a slurry method or a solution method.

As the soluble vanadium compound, there is preferably employed a reaction product of $VOCl_3$ and/or $VCl_4$ and an alcohol. Examples of such alcohol include methanol, ethanol, n-propanol, isopropanol, n-butanol, sec-butanol, t-butanol, n-hexanol, n-octanol, 2-ethylhexanol, n-decanol and n-dodecanol, among which preferred is an alcohol with 3 to 8 carbon atoms.

Also as the organic aluminum compound, there can be employed, for example, triethyl aluminum, triisobutyl aluminum, tri-n-hexyl aluminum, diethyl aluminum monochloride, diisobutyl aluminum monochloride, ethyl aluminum sesquichloride, butyl aluminum sesquichloride, ethyl aluminum dichloride, butyl aluminum dichloride, or methyl aluminoxane which is a reaction product of trimethyl aluminum and water. Among these, there is particularly preferred ethyl aluminum sesquichloride, butyl aluminum sesquichloride, a mixture of ethyl aluminum sesquichloride and triisobutyl aluminum, or a mixture of triisobutyl aluminum and butyl aluminum sesquichloride.

Also as the solvent, a hydrocarbon solvent is preferable, and n-pentane, n-hexane, n-heptane, n-octane, isooctane or cyclohexane is particularly preferable. These may be employed singly or in a combination of two or more kinds.

A content of rubber included in the polymer composition, for a sum of rubber and olefinic resin taken as 100 parts by mass, is preferably 20 to 95 parts by mass, particularly preferably 40 to 94 parts by mass, and further preferably 60 to 93 parts by mass. A rubber content less than 20 parts by mass tends to reduce flexibility and elasticity of the specific-sized rubber particle-containing composition [A]. On the other hand, a content exceeding 95 parts by mass decreases fluidity of the specific-sized rubber particle-containing composition [A], thereby significantly deteriorating the moldability.

3) Gel Fraction of Rubber

The rubber included in the specific-sized rubber particle-containing composition [A] has a gel fraction of 80% or higher, preferably 90% or higher, particularly preferably 95% or higher, further preferably 96% or higher and most preferably 97% or higher. From the standpoint of the mechanical strength of the specific-sized rubber particle-containing composition [A], such gel fraction is preferably 95% or higher, and a gel fraction less than 95% results in a decrease in the mechanical strength and also in an insufficient rubber elasticity. The gel fraction is measured in the following manner.

About 200 mg of a specific-sized rubber particle-containing composition [A] are weighed and cut into small pieces. Then the small pieces are immersed for 48 hours at 23° C. in 100 ml of cyclohexane in a closed container. Then the small pieces are taken out on a filter paper, and are dried under a reduced pressure for 1 hour at 105° C. in a vacuum dryer. From a mass of the dried residue, (1) a mass of a cyclohexane-insoluble portion (filler, pigment or the like.) other than the rubber and the olefinic resin, and (2) a mass of the olefinic resin contained in the sample before immersion in cyclohexane, are deducted to obtain a "corrected final mass (p)".

On the other hand, from a mass of the sample, (3) a mass of a cyclohexane-soluble portion (for example softening agent) other than the rubber and the olefinic resin, (1) a mass of a cyclohexane-insoluble portion (filler, pigment or the like.) other than the rubber and the olefinic resin, and (4) a mass of the olefinic resin, are deducted to obtain a "corrected initial mass (q)".

The gel fraction (cyclohexane-insoluble portion) is calculated from a following equation:

gel fraction(mass %)=[{corrected final mass $(p)$}÷{corrected initial mass$(q)$}]×100.

4) Rubber Content

A content of the rubber is, for a sum of the rubber and the olefinic resin taken as 100 parts by mass, preferably 20 to 95 parts by mass, particularly preferably 40 to 94 parts by mass and further preferably 60 to 93 parts by mass. A rubber content less than 20 parts by mass tends to reduce the flexibility and the elasticity of the thermoplastic elastomer. On the other hand, a content exceeding 95 parts by mass may reduce the fluidity of the thermoplastic elastomer composition, thereby undesirably resulting in an insufficient moldability.

5) Crosslinked Rubber Particles

Crosslinked rubber particles in the specific-sized rubber particle-containing composition [A] can be observed under a transmission electron microscope (hereinafter represented as TEM). In the specific-sized rubber particle-containing composition [A], a number-averaged particle size dn of the rubber particles, calculated from areas of the crosslinked rubber particles obtained from an image analysis of a TEM photograph showing the crosslinked rubber particles, is 3 µm or less, preferably 2 µm or less, particularly preferably 1.4 µm or less and further preferably 1.0 µm or less, and a ratio dv/dn of a volume-averaged particle size dv and a number-averaged particle size dn, determined from the number-averaged particle size dn, is 1.5 or less, preferably 1.4 or less, and particularly preferably 1.3 or less. Within such range, there can be obtained a specific-sized rubber particle-containing composition [A] having desired satisfactory rubber elasticity, mechanical properties and moldability. Even in case the dv/dn ratio is 1.5 or less, a number-averaged particle size exceeding 2 µm, particularly 3 µm, tends to deteriorate the moldability. Also even in case the number-averaged particle size is 3 µm or less, particularly 2 µm or less, a dv/dn ratio exceeding 1.5 tends to deteriorate the mechanical properties. The dv/dn ratio of 1 indicates that the particles are in a uniform state with an aligned size, and the ratio larger than 1 indicates that the particle are more uneven with more unaligned sizes.

For observation of the specific-sized rubber particle-containing composition [A] under the TEM, the specific-sized rubber particle-containing composition [A] is at first formed into a thin slice by a frozen microtome method and is dyed with a dyeing agent such as ruthenium tetroxide, osmium tetroxide, chlorosulfonic acid, uranyl acetate, phosphotungstenic acid, iodide ion or trifluoroacetic acid. In selecting the dyeing agent, it is necessary to select an optimum dyeing agent according to the kind of the functional group present in the molecule of the specific-sized rubber particle-containing composition [A] to be observed. As the dyeing agent, ruthenium tetroxide or osmium tetroxide is optimum.

Then the dyed slice of the specific-sized rubber particle-containing composition [A] is photographed with a magnification of 2000 times under a TEM.

The number-averaged particle size and the volume-averaged particle size can be determined by an image analysis of a TEM photograph, and there can be utilized an image analysis software such as Image-Pro Plus Ver. 4.0 for Windows (manufactured by MediaCybernetics (U.S.A.), sold by Planetron Hanbai Co.).

The number-averaged particle size dn and the volume-averaged particle size dv can be obtained by determining areas of the crosslinked rubber particles by the image analysis and executing calculations according to following equations. More specifically, there can be utilized a calculating method described in J. Macromol. Sci. Phys., B38(5 & 6), 527(1999):

1) A calculation formula of a diameter ($dn_j$) of a circle converted from an area of a crosslinked rubber particle obtained from the image analysis of TEM photograph:

$$dn_j = \sqrt{\frac{4}{\pi} \cdot A_{particle}}$$

A: area of crosslinked rubber particle obtained from image analysis of TEM photograph 2) A calculation formula of a number-averaged particle size (dn) of crosslinked rubber particles:

$$d_n = \frac{\sum_i d_{n_j}}{n}$$

3) A calculation formula of a volume-averaged particle size (dv) of crosslinked rubber particles:

$$d_v = \sqrt{\frac{\sum_i d_{n_j}^3}{n}}$$

(2) Olefinic Resin

As the olefinic resin to be employed in the specific-sized rubber particle-containing composition [A] of the invention, there can be employed a crystalline olefinic resin and/or an amorphous olefinic resin.

1) Crystalline Olefinic Resin

The crystalline olefinic resin is not particularly limited, however it preferably includes an α-olefin as a principal constituent unit. More specifically, it preferably includes, for the entire olefinic resin taken as 100 mol %, an α-olefinic unit by 80 molt or more, particularly preferably 90 molt or more.

The crystalline olefinic resin can be a single polymer of α-olefin, or a copolymer of two or more α-olefins. It can also be a copolymer of an α-olefin and another monomer. It can further be a mixture of two or more crystalline olefinic resins and/or copolymer resins.

For use in the preparation of the crystalline olefinic resin, there is preferred an α-olefin with 3 or more carbon atoms, and an α-olefin with 3 to 12 carbon atoms described in the aforementioned copolymer rubber is more preferable. In case the crystalline olefinic resin is a copolymer with ethylene, an ethylene content, for the entire copolymer taken as 100 mol %, is preferably 40 molt or less, particularly 20 molt or less.

In case the crystalline olefinic resin is a copolymer, the copolymer can be a random copolymer or a block copolymer. However, in order to obtain a random copolymer having a crystallinity explained in the following, taking the entire random copolymer as 100 molt, a total content of constituent units excluding α-olefin is preferably made 15 molt or less, particularly preferably 10 molt or less. In case of being a block copolymer, taking the entire block copolymer as 100 mol %, a total content of constituent units excluding α-olefin is preferably made 40 mol % or less, particularly preferably 20 mol % or less.

The random copolymer can be prepared by a method similar to that for the aforementioned copolymer rubber. Also a block copolymer can be prepared for example by a living polymerization utilizing a Ziegler-Natta catalyst.

The crystalline olefinic resin preferably has a crystallinity, measured by an X-ray diffraction, of 50% or higher, particularly preferably 53% or higher and further preferably 55% or higher. Also, the crystallinity is closely related with a density. For example, in case of polypropylene, an α-crystal (monoclinic) has a density of about 0.936 g/cm$^3$, a smectic microcrystal (pseudo hexagonal) has a density of about 0.886 g/cm$^3$, and an amorphous (atactic) component has a density of about 0.850 g/cm$^3$. Also in case of poly-1- butene, an isotactic crystal has a density of about 0.91 g/cm³, and an amorphous component (atactic) has a density of about 0.87 g/cm³. Consequently, in order to obtain a crystalline polymer with a crystallinity of 50% or higher, there is preferred a density of 0.89 g/cm³ or higher, particularly 0.90 to 0.94 g/cm³. A crystallinity less than 50% or a density less than 0.89 g/cm³ tends to deteriorate the heat resistance and the strength of the specific-sized rubber particle-containing composition [A].

Also in the crystalline olefinic resin, a maximum peak temperature measured by a scanning differential calorimeter, or a melting point (hereinafter represented simply as "$T_m$"), is variable depending on the monomer to be employed, however it is preferably 100° C. or higher, particularly preferably 120° C. or higher. A $T_m$ less than 100° C. may not provide a heat resistance and a strength in a sufficient level.

Also the crystalline olefinic resin preferably has a melt flow rate (hereinafter simply represented as "MFR"), measured at a temperature of 230° C. and under a load of 2.16 kg, of 0.1 to 100 g/10 minutes, particularly preferably 0.5 to 80 g/10 minutes. An MFR less than 0.1 g/10 minutes tends to provide a kneading workability and an extrusion workability of an insufficient level. On the other hand, an MFR exceeding 100 g/10 minutes tends to deteriorate the strength.

Consequently, as the crystalline olefinic resin, it is particularly preferably to employ polypropylene and/or a copolymer of propylene and ethylene, having a crystallinity of 50% or higher, a density of 0.89 g/cm³ or higher, an ethylene unit content of 20 mol % or less, a $T_m$ of 100° C. or higher, an MFR of 0.1 to 100 g/10 minutes and a melting point of 140 to 170° C.

2) Amorphous Olefinic Resin

The amorphous olefinic resin is not particularly limited, however it preferably includes an α-olefin as a principal constituent unit. More specifically, it preferably includes, taking the entire amorphous olefinic resin as 100 mol %, an α-olefinic unit by 50 molt or more, particularly preferably 60 molt or more.

The amorphous olefinic resin can be a single polymer of α-olefin, or a copolymer of two or more α-olefins. It can also be a copolymer of an α-olefin and another monomer. It can further be a mixture of two or more polymers and/or copolymers.

For use in the preparation of the amorphous olefinic resin, there is preferred an α-olefin with 3 or more carbon atoms, and an α-olefin with 3 to 12 carbon atoms described in the aforementioned copolymer rubber is more preferable.

Examples of the amorphous olefinic resin include a single polymer such as atactic polypropylene, or atactic poly-1-butene, a copolymer of propylene (preferably containing the propylene unit by 50 molt or more) with another α-olefin such as ethylene, 1-butene, 1-pentene, 1-hexene, 4-methyl-1-pentene, 1-octene or 1-decene, and a copolymer of 1-butene (preferably containing the 1-butene unit by 50 molt or more) with another α-olefin such as ethylene, propylene, 1-pentene, 1-hexene, 4-methyl-1-pentene, 1-octene or 1-decene.

In case the amorphous olefinic resin is a copolymer, the copolymer can be a random copolymer or a block copolymer. However, in case of block copolymer, an α-olefin unit such as a propylene unit or a 1-butene unit constituting a principal unit in the copolymer has to be bonded by an atactic structure. Also in case of an amorphous olefinic resin formed by a copolymer of an α-olefin with 3 or more carbon atoms and ethylene, an α-olefin content, taking the entire copolymer as 100 mol %, is preferably 50 mol % or higher, particularly preferably 60 to 100 mol %.

As the amorphous olefinic resin, there is particularly preferred atactic polypropylene (with a propylene content of 50 mol % or higher), a copolymer of propylene (50 mol % or higher) and ethylene, or a copolymer of propylene (50 mol % or higher) and 1-butene.

The atactic polypropylene can be obtained as a by-product of crystalline polypropylene. Also, atactic polypropylene or atactic poly-1-butene can be obtained by a polymerization utilizing a catalyst constituted of a combination of a zirconocene compound and methyl alminoxane. The random copolymer can be prepared by a method similar to that for the aforementioned copolymer rubber, and the block copolymer can be prepared for example by a living polymerization utilizing a Ziegler-Natta catalyst.

The amorphous olefinic resin preferably has a melt viscosity at 190° C. of 50 Pa·s or less, particularly preferably 0.1 to 30 Pa·s and further preferably 0.2 to 20 Pa·s. A melt viscosity exceeding 50 Pa·s tends to reduce an adhesion strength with a member to be adhered, in case of an injection fusion with vulcanized rubber or a thermoplastic elastomer.

Also the amorphous olefinic resin preferably has a crystallinity, measured by an X-ray diffraction, less than 50%, particularly preferably 30% or less and further preferably 20% or less. Also, as in the case of the crystalline olefinic resin, the crystallinity is closely related with a density, which is preferably 0.85 to 0.89 g/cm³, particularly 0.85 to 0.88 g/cm³. A crystallinity exceeding 50% and/or a density exceeding 0.89 g/cm³ tends to reduce an adhesion strength with a member to be adhered, in case of an injection fusion with vulcanized rubber or a thermoplastic elastomer.

Also the amorphous olefinic resin preferably has a number-averaged molecular weight ($M_n$) of 1,000 to 20,000, particularly preferably 1,500 to 15,000.

As the olefinic resin, the crystalline olefinic resin and the amorphous olefinic resin may be employed in combination, or either one may be employed alone.

3) Content of Olefinic Resin

A content of the olefinic resin, for a sum of the rubber and the olefinic resin taken as 100 parts by mass, is preferably 5 to 80 parts by mass, particularly preferably 6 to 60 parts by mass and further preferably 7 to 40 parts by mass. In case the content of the olefinic resin is less than 5 parts by mass, a phase structure (morphology) of the specific-sized rubber particle-containing composition [A] may not assume a satisfactory sea-island structure (olefinic resin constituting a sea (matrix) and crosslinked rubber constituting an island (domain)) which is a feature of the dynamically crosslinked thermoplastic elastomer, thereby deteriorating the moldability and the mechanical properties. On the other hand, a content exceeding 80 parts by mass undesirably reduces the flexibility and the rubber elasticity of the specific-sized rubber particle-containing composition [A].

(3) Softening Agent

The specific-sized rubber particle-containing composition [A] usually includes a softening agent. Such softening agent is not particularly restricted, and can be, for example, (1) a carboxylic acid-based softening agent such as stearic acid or lauric acid, (2) a vegetable oil-based softening agent such as palm oil, cotton seed oil, linseed oil, or rape oil, (3) pine tar, (4) a factice such as white factice, black factice or brown factice, (5) a mineral oil type softening agent such as a paraffinic mineral oil, a naphthenic mineral oil or an aromatic mineral oil, (6), an ester softening agent such as dibutyl phthalate, dioctyl phthalate, dioctyl adipate, dibutyl glycol adipate, dibutyl carbitol adipate, dioctyl sebacate, dibutyl sebacate, tricresyl phosphate, cresylphenyl phosphate, tributyl phosphate, trioctyl phosphate, tributoxyethyl phosphate, a polyether plasticizer, or an adipate polyester, and (7) a hydrocarbon softening agent such as a polybutene agent or a polybutadiene agent. Among these, a minetal oil softening agent is preferable, and a mineral oil type softening agent with a weight average molecular weight of 300 to 2,000, particularly 500 to 1,500 is particularly preferable. The softening agent for rubber based on mineral oil hydrocarbons is generally a mixture of an aromatic ring component, a naphthene ring component and a paraffin chain component, and is classified into a paraffinic oil in which a number of carbon atoms of the paraffin chain represents 50% or more of total number of carbon atoms, a naphthenic oil in which a number of carbon atoms of the naphthene ring represents 30 to 45% of total number of carbon atoms, and an aromatic oil in which a number of carbon atoms of the aromatic ring represents 30% or more of total number of carbon atoms. In the invention, there is preferred a paraffinic oil, more preferably a hydrogenated paraffinic oil. Also the mineral oil hydrocarbon preferably has a dynamic viscosity at 40° C. of 20 to 800 cSt, particularly preferably 50 to 600 cSt, and a fluidity point of −40 to 0° C., particulary preferably −30 to 0° C. Such hydrocarbon may be employed singly or in a combination of two or more kinds.

A content of the softening agent can be made 200 parts by mass or less with respect to 100 parts by mass of rubber, preferably 180 parts by mass or less, particularly preferably 150 parts by mass or less and further preferably 100 parts by mass or less. A softening agent content exceeding 150 parts by mass, particularly 200 parts by mass, tends to cause a bleeding out of the softening agent from specific-sized rubber particle-containing composition [A] or a deterioration of the mechanical properties and the rubber elasticity. In case of employing an oil-extended rubber, the softening agent may be that contained in the oil-extended rubber only, or may be added as a post-addition.

The specific-sized rubber particle-containing composition [A] can be easily worked for example by injection molding, extrusion molding, blow molding, compression molding, vacuum molding, laminate molding or calender molding, and can provide a thermoplastic elastomer molded article excellent in rubber elasticity and mechanical properties.

[2] A Thermoplastic Elastomer Composition Including Acrylate Resin

Another thermoplastic elastomer composition of the invention (hereinafter called "acrylate resin-containing composition [B]") is characterized in being formed by dynamically heat-treating, in the presence of a crosslinking agent, of a polymer composition including a rubber, an olefinic resin, a (meth)acrylate resin and a hydrogenated diene polymer.

In the acrylate resin-containing composition [B], the rubber and the olefinic resin can be those described in the foregoing. The rubber is particularly preferably an ethylene•α-olefin random copolymer rubber. As the olefinic resin, there can be employed a crystalline olefinic resin and/or an amorphous olefinic resin. As the crystalline olefinic resin, polypropylene or a propylene-ethylene copolymer is particularly preferable. Also as the amorphous olefinic resin, there is particularly preferred atactic polypropylene (with a propylene content of 50 mol % or higher), a copolymer of propylene (50 mol % or higher) and ethylene, or a copolymer of propylene (50 mol % or higher) and 1-butene.

In the acrylate resin-containing composition [B], the rubber, for a sum of the rubber, the olefinic resin, the (meth)acrylate resin and the hydrogenated diene polymer taken as 100 mass %, is preferably present within a range of 20 to 95 mass %, particularly preferably 30 to 90 mass %. Also the olefinic resin is preferably present within a range of 3 to 70 mass %, particularly preferably 5 to 60 mass %. A rubber content less than 20 mass % reduces the flexibility and the rubber elasticity of the acrylate resin-containing composition [B]. On the other hand, a content exceeding 95 mass % reduces the fluidity of the acrylate resin-containing composition [B], thereby significantly deteriorating the moldability. Also in case the content of the olefinic resin is less than 3 mass %, a phase structure (morphology) of the acrylate resin-containing composition [B] may not assume a satisfactory sea-island structure (olefinic resin constituting a sea (matrix) and crosslinked rubber constituting an island (domain)) which is a feature of the dynamically crosslinked thermoplastic elastomer, thereby deteriorating the moldability and the mechanical properties. On the other hand, a content exceeding 70 mass % undesirably reduces the flexibility and the rubber elasticity of the acrylate resin-containing composition [B].

The acrylate resin-containing composition [B] usually includes an aforementioned softening agent. A content of the softening agent can be made 200 parts by mass or less with respect to 100 parts by mass of rubber, preferably 180 parts by mass or less, particularly preferably 150 parts by mass or less and further preferably 100 parts by mass or less. A softening agent content exceeding 150 parts by mass, particularly 200 parts by mass, tends to cause a bleeding out of the softening agent from the acrylate resin-containing composition [B] or a deterioration of the mechanical properties and the rubber elasticity. In case of employing an oil-extended rubber, the softening agent may be that contained in the oil-extended rubber only, or may be added as a post-addition.

(1) (Meth)acrylate Resin

As the (meth)acrylate resin, there can be employed a polymer of vinyl monomers principally constituted of a monomer having an acryl group or a methacryl group. A monomer having an acryl group or a methacryl group means a monomer having at least an acryl group or a methacryl group, and examples include an acrylate alkyl ester such as methyl acrylate, ethyl acrylate, n-propyl acrylate, isopropyl acrylate, n-butyl acrylate, t-butyl acrylate, s-butyl acrylate, 2-methylbutyl acrylate, 3-methylbutyl acrylate, n-hexyl acrylate, n-heptyl acrylate, n-octyl acrylate, or 2-ethylhexyl acrylate; a diacrylate ester such as ethylene glycol diacrylate, 1,2-propylene glycol diacrylate, 1,3-propylene glycol diacrylate, 1,2-butylene glycol diacrylate, 1,3-butylene glycol diacrylate, or 1,4-butylene glycol diacrylate; a methacrylate alkyl ester such as methyl methacrylate, ethyl methacrylate, n-propyl methacrylate, isopropyl methacrylate, n-butyl methacrylate, t-butyl methacrylate, s-butyl methacrylate, 2-methylbutyl methacrylate, 3-methylbutyl methacrylate, n-hexyl methacrylate, n-heptyl methacrylate, n-octyl methacrylate, or 2-ethylhexyl methacrylate; and a dimethacrylate alkyl ester such as 1,2-propylene glycol dimethacrylate, 1,3-propylene glycol dimethacrylate, 1,2-butylene glycol dimethacrylate, 1,3-butylene glycol dimethacrylate, or 1,4-butylene glycol dimethacrylate.

Among the (meth)acrylate resins, a homopolymer methyl methacrylate or a copolymer formed by copolymerizing methyl methacrylate as a principal component and another with a small amount of another monomer is preferable. Such another monomer can be, for example, acrylic acid; an acylic acid metal salt; an acrylate ester such as methyl acrylate, ethyl acrylate, n-butyl acrylate, s-butyl acrylate, t-butyl acrylate or 2-ethylhexyl acrylate; methacrylic acid, a methacrylic acid metal salt; a methacrylate ester such as ethyl methacrylate, n-butyl methacrylate, s-butyl methacrylate, t-butyl methacrylate, 2-hydroxyethyl methacrylate, glycidyl methacrylate, or cyclohexyl methacrylate; an acetate ester such as vinyl acetate; an aromatic vinyl compound such as styrene or α-methylstyrene; maleic anhydride, a maleic acid monoalkyl ester, a maleic acid dialkyl ester, or a maleimide such as N-phenylmaleimide.

The copolymer is not particularly limited to a type, and can be a random copolymer, a block copolymer such as of diblock, triblock, multiblock, or combtooth-shaped block type, or a multi-stage block copolymer. Also the (meth) acrylate resin is not particularly limited in its structure, and can be any of a linear type, a ramified type or a multi-layered type.

An MFR of the (meth)acrylate resin, measured at a temperature of 230° C. and under a load of 3.8 kgs is not particularly restricted, however it is preferably 0.1 to 100 g/10 minutes, particularly preferably 0.5 to 80 g/10 minutes.

The acrylate resin-containing composition [B] preferably has a (meth)acrylate resin content of 1 to 20 mass %, particularly preferably 5 to 15 mass %. A content less than 1 mass % deteriorates the scratch resistance of the acrylate resin-containing composition [B]. On the other hand, a content exceeding 20 mass % undesirably reduces the flexibility and the rubber elasticity of the acrylate resin-containing composition [B].

(2) Hydrogenated Diene Polymer

Examples of the hydrogenated diene polymer include hydrogenated products of diene polymers such as a homopolymer of a conjugate diene monomer, a random copolymer of a conjugate diene monomer and a vinyl aromatic monomer, a block copolymer formed by polymer blocks of a vinyl aromatic monomer and polymer blocks of a conjugate diene monomer, a block copolymer formed by polymer blocks of a vinyl aromatic monomer and random copolymer blocks of a conjugate diene monomer and a vinyl aromatic monomer, a block copolymer formed by polymer blocks of a conjugate diene monomer and copolymer blocks of a conjugate diene monomer and a vinyl aromatic monomer, a block copolymer formed by polymer blocks of a conjugate diene monomer and tapered blocks of a vinyl aromatic monomer and a conjugate diene monomer in which the vinyl aromatic monomer increases gradually, a block copolymer formed by random copolymer blocks of a conjugate diene monomer and a vinyl aromatic monomer and tabered blocks of a vinyl aromatic monomer and a conjugate diene monomer in which the vinyl aromatic monomer increases gradually, and a block copolymer formed by polybutadiene blocks with vinyl bonds representing 30 mass % or less and polymer blocks of a conjugate diene monomer with vinyl bonds representing more than 30 mass % (such polymer prior to hydrogenation being also called "pre-hydrogenation polymers").

Among these hydrogenated diene polymers, there is preferred a hydrogenated product of a conjugate diene polymer having a polymer block (A) principally constituted of a vinyl aromatic monomer and a polymer block (B) principally constituted of a conjugate diene monomer, particularly a hydrogenated product of a conjugate diene polymer having a following block structure.

The polymer block (A) has a structure of a homopolymer of a vinyl aromatic monomer or a copolymer of a vinyl aromatic monomer unit containing a vinyl aromatic monomer in excess of 50 mass %, preferably in excess of 70 mass %, and a copolymerizable another monomer, preferably a conjugate diene monomer, and the polymer block (B) has a structure of a homopolymer of a conjugate diene monomer or a copolymer thereof copolymerized with another monomer such as a vinyl aromatic monomer in an amount of 5 mass % or less, and the block copolymer has a block structure of (A-B)n-A type (n being an integer from 1 to 10) or (A-B)m type (m being an integer from 2 to 10). The block A at an end may have a short block B. Also there can be employed a structure of [(A-B)n]m-M type (M represents a coupling agent residue such as Si or Sn; m is a valence number of the coupling agent residue and is an integer from 2 to 4; and n is an integer from 1 to 10, preferably 1 or 2).

Such block copolymer may have plural kinds of the polymer block (A) and/or the polymer block (B), for example an $A_1$-B-$A_2$ type or an $A_1$-$B_1$-$A_2$-$B_2$ type. Monomer units constituting each of the blocks $A_1$ and $A_2$ may be same or different. Also the blocks $B_1$ and $B_2$ may be same or different in the weight average molecular weight.

Examples of the vinyl aromatic monomer to be employed in the preparation of the pre-hydrogenation polymer include styrene, α-methylstyrene, p-methylstyrene, t-butylstyrene, divinylbenzene, N,N-dimethyl-p-aminoethylstyrene, 2,4-dimethylstyrene, N,N-diethyl-p-aminoethylstyrene, 2,4-dimethylstyrene, vinylnaphthalene and vinylanthracene, among which styrene and α-methylstyrene are preferred. These may be employed singly or in a combination of two or more kinds.

Also examples of the conjugate diene monomer to be employed in the preparation of the pre-hydrogenation polymer include 1,3-butadiene, isoprene, 2,3-dimethyl-1,3-butadiene, 1,3-pentadiene, 2-methyl-1,3-pentadiene, 1,3-hexadiene, 4,5-dimethyl-1,3-octadiene and chloroprene, among which preferred are 1,3-butadiene and isoprene. These may be employed singly or in a combination of two or more kinds.

In the polymer block A, another monomer copolymerizable with the vinyl aromatic monomer is principally an aforementioned conjugate diene monomer, particularly preferably 1,3-butadiene or isoprene.

In the preparation of the pre-hydrogenation polymer, the conjugate diene monomer and the vinyl aromatic monomer have a composition ratio (conjugate diene monomer/vinyl aromatic monomer) preferably within a range of 95/5 to 40/60 in mass ratio, more preferably 93/7 to 45/55.

In the conjugate diene unit of the pre-hydrogenation polymer, a vinyl bond content (proportion of 1,2- and 3,4-vinyl bonds in the conjugate diene unit of the pre-hydrogenation polymer) is not particularly restricted, however it is preferably 50 to 85%, particularly preferably 60 to 85%.

In such hydrogenated diene polymer, double bonds contained in the conjugate diene unit of the pre-hydrogenation polymer and derived from the conjugate diene are preferably saturated by 80% or more, particularly preferably 90% or more. A proportion of saturation less than 80% deteriorates the weather resistance or the like. Also the hydrogenated diene polymer has a weight average molecular weight of 5,000 to 1,000,000, preferably 10,000 to 500,000.

The acrylate resin-containing composition [B] has a content of the hydrogenated diene polymer of 1 to 10 mass %, particularly preferably 2 to 9 mass %. A content less than 1 mass % decreases a mutual solubility of rubber, particularly ethylene•α-olefin copolymer rubber with olefinic resin and (meth)acrylate resin, thereby deteriorating the mechanical properties. On the other hand, a content exceeding 20 mass % undesirably reduces the flexibility and the rubber elasticity of the acrylate resin-containing composition [B].

The acrylate resin-containing composition [B] has flexibility and excellent scratch resistance and moldability, and can be widely employed in applications in which olefinic thermoplastic elastomers have been utilized, for example automotive external and internal surface materials such as a bumper, an external lace, a window sealing gasket, a door sealing gasket, a trunk sealing gasket, a roofside rail, an emblem, an inner panel or a console box, a leather sheet requiring a scratch resistance such as a weather strip, sealants or internal/external surface materials for aircraft and ship, sealants, internal/external surface materials or waterproof sheet materials for construction and building, sealants for general machinery and apparatus, a packing or a housing for consumer electric appliances, parts for medical equipment, electric wires, household goods, sporting goods or the like.

[3] A Thermoplastic Elastomer Composition Including a Maleimide Compound

Another thermoplastic elastomer composition of the invention (hereinafter called "maleimide compound-containing composition [C]") is characterized in being formed by dynamically heat-treating, in the presence of a crosslinking agent, of a polymer composition including a rubber, an olefinic resin, a softening agent and a maleimide compound, in which, for a sum of said rubber, said olefinic resin and said softening agent taken as 100 mass %, said olefinic resin is present at a level of 5 to 36 mass %, and for a sum of the rubber, the olefinic resin and the softening agent taken as 100 parts by mass, the maleimide compound is present at a level of 0.3 to 10 parts by mass.

In the maleimide compound-containing composition [C], the rubber and the olefinic resin can be those described in the foregoing. The rubber is particularly preferably an ethylene•α-olefin random copolymer rubber. As the olefinic resin, there can be employed a crystalline olefinic resin and/or an amorphous olefinic resin. As the crystalline olefinic resin, polypropylene or a propylene-ethylene copolymer is particularly preferable. Also as the amorphous olefinic resin, there is particularly preferred atactic polypropylene (with a propylene content of 50 mol % or higher), a copolymer of propylene (50 mol % or higher) and ethylene, or a copolymer of propylene (50 mol % or higher) and 1-butene.

In the maleimide compound-containing composition [C], for a sum of the rubber, the olefinic resin and the softening agent taken as 100 mass %, the rubber is preferably present within a range of 20 to 85 mass %, particularly preferably 30 to 80 mass %. Also the olefinic resin is preferably present within a range of 5 to 36 mass %, particularly preferably 10 to 36 mass %. A rubber content less than 20 mass % reduces the flexibility and the rubber elasticity of the maleimide compound-containing composition [C]. On the other hand, a content exceeding 85 mass % reduces the fluidity of the maleimide compound-containing composition [C], thereby significantly deteriorating the moldability. Also in case a content of the olefinic resin is less than 5 mass %, a phase structure (morphology) of the maleimide compound-containing composition [C] may not assume a satisfactory sea-island structure (olefinic resin constituting a sea (matrix) and crosslinked rubber constituting an island (domain)) which is a feature of the dynamically crosslinked thermoplastic elastomer, thereby deteriorating the moldability and the mechanical properties. On the other hand, a excessive content undesirably reduces the flexibility and the rubber elasticity of the maleimide compound-containing composition [C].

The maleimide compound-containing composition [C] usually includes an aforementioned softening agent. A content of the softening agent, for a sum of the rubber, the olefinic resin and the softening agent taken as 100 mass %, is 10 to 75 mass %, preferably 20 to 60 mass %. A softening agent content less than 10 mass % results in an insufficient moldability of the maleimide compound-containing composition [C]. On the other hand, a content exceeding 75 mass % deteriorates the rubber elasticity and the mechanical properties. In case of employing an oil-extended rubber, the softening agent may be that contained in the oil-extended rubber only, or may be added as a post-addition.

In the maleimide compound-containing composition [C], the polymer composition may further include a (meth) acrylate resin. The (meth)acrylate resin can be that described in the foregoing. Also, for a sum of rubber, olefinic resin and softening agent taken as 100 parts by mass, the (meth) acrylate resin is present at a level of 1 to 30 parts by mass, particularly preferably 5 to 15 parts by mass. A content of the (meth)acrylate resin less than 1 part by mass results in an insufficient scratch resistance of the maleimide compound-containing composition [C]. On the other hand, a content exceeding 30 parts by mass undesirably reduces the flexibility and the rubber elasticity of the maleimide compound-containing composition [C].

In the maleimide compound-containing composition [C], the polymer composition may further include a hydrogenated diene polymer in addition to the (meth)acrylate resin. The hydrogenated diene polymer can be that described in the foregoing. A content of the hydrogenated diene polymer, with respect to the (meth)acrylate resin, is preferably 0.1 to 1 in mass ratio, particularly preferably 0.3 to 0.7. A mass ratio less than 0.1 decreases a mutual solubility of rubber, particularly ethylene•α-olefin random copolymer rubber with olefinic resin and (meth)acrylate resin, thereby deteriorating the mechanical properties. On the other hand, a mass ratio exceeding 1 undesirably reduces the flexibility and the rubber elasticity of the maleimide compound-containing composition [C].

(1) Maleimide Compound

The maleimide compound functions as a crosslinking agent, particularly as an auxiliary crosslinking agent in case of dynamically heat-treating with an organic peroxide. The maleimide compound can be N,N'-m-phenylene bismaleimide or N,N'-toluylene bismaleimide, and there is preferred N,N'-m-phenylene bismaleimide (CAS: 3006-93-7).

A content of the maleimide compound, for a sum of the rubber, the olefinic resin and the softening agent taken as 100 parts by mass, is 0.3 to 10 parts by mass, preferably 0.4 to 8 parts by mass and particularly preferably 0.5 to 5 parts by mass. A content of the maleimide compound less than 0.3 parts by mass may be unable to provide a maleimide compound-containing composition [C] excellent in injection fusibility and elastic recovery in an injection fused portion. On the other hand, a content exceeding 10 parts by mass may result in an excessively high crosslinking degree, thereby deteriorating the moldability or the injection fusibility.

The maleimide compound-containing composition [C], having an excellent injection fusibility, can be utilized in a thermoplastic elastomer molded article formed as an injection fused composite with an olefinic vulcanized rubber such as ethylene-propylene rubber, ethylene-propylene-diene rubber, ethylene-butene rubber, or ethylene-butene-diene rubber; a vulcanized rubber such as ethylene-acrylate rubber, chlorinated polyethylene, chlorosulfonated polyethylene, styrene-butadiene rubber, nitrile rubber, chloroprene rubber, acryl rubber, or urethane rubber; or a thermoplastic elastomer such as an olefinic thermoplastic elastomer, a polyester thermoplastic elastomer, a polyurethane thermoplastic elastomer, or polyamide thermoplastic elastomer. As an adhered member, an olefinic vulcanized rubber or an olefinic thermoplastic elastomer is particularly preferred.

[4] A Thermoplastic Elastomer Composition Including Polysiloxane

Another thermoplastic elastomer composition of the invention (hereinafter called a "polysiloxane-containing composition [D]") is characterized in being formed by dynamically heat-treating, in the presence of a crosslinking agent, of a polymer composition including a rubber, a softening agent, an olefinic resin, a low-viscosity undenatured organopolysiloxane having a viscosity measured at 25° C. according to JIS K2283 less than 10,000 cSt, a high-viscosity undenatured organopolysiloxane having a viscosity measured at 25° C. according to JIS K2283 equal to or higher than 10,000 cSt, and a denatured organopolysiloxane.

In the polysiloxane-containing composition [D], the rubber and the olefinic resin can be those described in the foregoing. The rubber is particularly preferably an ethylene•α-olefin copolymer rubber. As the olefinic resin, there can be employed a crystalline olefinic resin and/or an amorphous olefinic resin. As the crystalline olefinic resin, polypropylene or a propylene-ethylene copolymer is particularly preferable. Also as the amorphous olefinic resin, there is particularly preferred atactic polypropylene (with a propylene content of 50 mol % or higher), a copolymer of propylene (50 mol % or higher) and ethylene, or a copolymer of propylene (50 mol % or higher) and 1-butene.

In the polysiloxane-containing composition [D], for a sum of the rubber, the olefinic resin and the softening agent taken as 100 parts by mass, the rubber is preferably present within a range of 20 to 69 parts by mass, particularly preferably 23 to 65 parts by mass and further preferably 25 to 60 parts by mass. Also the olefinic resin is preferably present within a range of 1 to 50 parts by mass, particularly preferably 2 to 45 parts by mass and further preferably 5 to 40 parts by mass. A rubber content less than 20 parts by mass may reduce the flexibility and the rubber elasticity of the polysiloxane-containing composition [D]. On the other hand, a content exceeding 69 parts by mass reduces the fluidity of the polysiloxane-containing composition [D], thereby significantly deteriorating the moldability. Also in case a content of the olefinic resin is less than 1 part by mass, a phase structure (morphology) of the polysiloxane-containing composition [D] may not assume a satisfactory sea-island structure (olefinic resin constituting a sea (matrix) and crosslinked rubber constituting an island (domain)) which is a feature of the dynamically crosslinked thermoplastic elastomer, thereby deteriorating the moldability and the mechanical properties. On the other hand, a content exceeding 50 parts by mass undesirably reduces the flexibility and the rubber elasticity of the polysiloxane-containing composition [D].

The polysiloxane-containing composition [D] usually includes an aforementioned softening agent. A content of the softening agent, for a sum of the rubber, the olefinic resin and the softening agent taken as 100 parts by mass, is preferably 20 to 79 parts by mass, particularly preferably 25 to 75 parts by mass and further preferably 25 to 70 parts by mass. A softening agent content less than 20 parts by mass results in an insufficient fluidity of the polysiloxane-containing composition [D]. On the other hand, a content exceeding 79 parts by mass may result in an insufficient dispersion of the rubber and the olefinic resin at kneading, and tends to reduce the rubber elasticity also. In case of employing an oil-extended rubber, the softening agent may be that contained in the oil-extended rubber only, or may be added as a post-addition.

The polysiloxane-containing composition [D] can also be obtained by dynamically heat-treating, in the presence of a crosslinking agent, of a polymer composition including an oil-extended rubber which contains a rubber and a softening agent, and in which, for a sum of the rubber and the softening agent taken as 100 mass %, the rubber is present at a level of 30 to 70 mass % and the softening agent is present at a level of 30 to 70 mass %, an olefinic resin, an undenatured organopolysiloxane having a viscosity measured at 25° C. according to JIS K2283 less than 10,000 cSt, an undenatured organopolysiloxane having a viscosity measured at 25° C. according to JIS K2283 equal to or higher than 10,000 cSt, and a denatured organopolysiloxane.

Also in such polysiloxane-containing composition [D] utilizing the oil-extended rubber, the rubber and the olefinic resin can be those described in the foregoing. The rubber is particularly preferably an ethylene•α-olefin copolymer rubber. As the olefinic resin, there can be employed a crystalline olefinic resin and/or an amorphous olefinic resin. As the crystalline olefinic resin, polypropylene or a propylene-ethylene copolymer is particularly preferable. Also as the amorphous olefinic resin, there is particularly preferred atactic polypropylene (with a propylene content of 50 mol % or higher), a copolymer of propylene (50 mol % or higher) and ethylene, or a copolymer of propylene (50 mol % or higher) and 1-butene.

Also for a sum of the rubber and the softening agent constituting the oil-extended rubber taken as 100 mass %, a content each is 30 to 70 mass %, preferably 35 to 65 mass % and particularly preferably 40 to 60 mass %. In case a content of the rubber is less than 30 mass % or a content of the softening agent exceeds 70 mass %, the polysiloxane-containing composition [D] may show a bleeding out of the softening agent or a deterioration in the mechanical properties and the rubber elasticity. On the other hand, in case a content of the rubber exceeds 70 mass % or a content of the softening agent is less than 30 mass %, the moldability of the polysiloxane-containing composition [D] may be deteriorated. As the softening agent, there can be utilized those explained in the foregoing, without particular limitation.

In the polysiloxane-containing composition [D], a softening agent may be further included by a post-addition, if necessary. Such post-added softening agent, for a sum of the oil-extended rubber, the olefinic resin and the post-added softening agent taken as 100 parts by mass, is preferably used in an amount of 50 parts by mass or less, particularly 45 parts by mass or less and further preferably 40 parts by mass or less. A content exceeding 50 parts by mass may result in an insufficient dispersion of the rubber and the olefinic resin at kneading, and tends to reduce the rubber elasticity also. As the post-added softening agent, there can be utilized those explained in the foregoing, without particular limitation.

In such polysiloxane-containing composition [D], for a sum of the oil-extended rubber, the olefinic resin and the post-added softening agent taken as 100 parts by mass, the oil-extended rubber is preferably present within a range of 30 to 99 parts by mass, particularly preferably 35 to 97 parts by mass and further preferably 40 to 95 parts by mass. Also the olefinic resin is preferably present within a range of 1 to 50 parts by mass, particularly preferably 2 to 45 parts by mass and further preferably 5 to 40 parts by mass. A rubber content less than 30 parts by mass may reduce the flexibility of the polysiloxane-containing composition [D]. On the other hand, a content exceeding 99 parts by mass reduces the fluidity of the polysiloxane-containing composition [D], thereby significantly deteriorating the moldability. Also in case a content of the olefinic resin is less than 1 part by mass, a phase structure (morphology) of the polysiloxane-containing composition [D] may not assume a satisfactory sea-island structure (olefinic resin constituting a sea (matrix) and crosslinked rubber constituting an island (domain)) which is a feature of the dynamically crosslinked thermoplastic elastomer, thereby deteriorating the moldability and the mechanical properties. On the other hand, a content exceeding 50 parts by mass undesirably reduces the flexibility and the rubber elasticity of the polysiloxane-containing composition [D].

(1) Low-viscosity or High-viscosity Undenatured Organopolysiloxane

The low-viscosity or high-viscosity undenatured organopolysiloxane is not particularly limited. The undenatured organopolysiloxane can be, for example, dimethylpolysiloxane, methylphenylpolysiloxane, fluoropolysiloxane, tetramethyltetraphenylpolysiloxane, or methylhydrogen polysiloxane, among which dimethylpolysiloxane is preferred. Also the low-viscosity undenatured organopolysiloxane and the high-viscosity undenatured organopolysiloxane may be a same compound or may be different.

1) Low-viscosity Undenatured Organopolysiloxane

The low-viscosity undenatured organopolysiloxane has a viscosity at 25° C. as defined by JIS K2283 less than 10,000 cSt, preferably less than 7,000 cSt and more preferably less than 5,000 cSt.

Also a content of the low-viscosity undenatured organopolysiloxane, for a sum of the oil-extended rubber, the olefinic resin and the post-added softening agent taken as 100 parts by mass, is preferably 1 to 10 parts by mass, particularly preferably 1 to 8 parts by mass and further preferably 1 to 5 parts by mass. However, a low-viscosity undenatured organopolysiloxane having a viscosity at 25° C. as defined by JIS K2283 less than 10,000 cSt, in case employed singly, tends to bleed out from the polysiloxane-containing composition [D].

2) High-viscosity Undenatured Organopolysiloxane

The high-viscosity undenatured organopolysiloxane has a viscosity at 25° C. as defined by JIS K2283 equal to or higher than 10,000 cSt, preferably 10,000 to 1,000,000 cSt and more preferably 10,000 to 100,000 cSt.

A content of the high-viscosity undenatured organopolysiloxane, for a sum of the oil-extended rubber, the olefinic resin and the post-added softening agent taken as 100 parts by mass, is preferably 1 to 10 parts by mass, particularly preferably 1 to 8 parts by mass and further preferably 1 to 5 parts by mass. However, a high-viscosity organopolysiloxane having a viscosity at 25° C. as defined by JIS K2283 equal to or higher than 10,000 cSt, in case employed singly, tends to result in an undesirably insufficient slidability.

A combined use of the low-viscosity undenatured organopolysiloxane having a viscosity at 25° C. as defined by JIS K2283 less than 10,000 cSt and the high-viscosity undenatured organopolysiloxane having a viscosity equal to or higher than 10,000 cSt significantly improves the slidability. As to preferable contents of these, the low-viscosity undenatured organopolysiloxane is employed in 1 to 10 parts by mass while the high-viscosity undenatured organopolysiloxane is employed in 1 to 10 parts by mass, and more preferably the low-viscosity undenatured organopolysiloxane is employed in 1 to 5 parts by mass while the high-viscosity undenatured organopolysiloxane is employed in 1 to 5 parts by mass.

(2) Denatured Organopolysiloxane

The denatured organopolysiloxane is not particularly restricted within organopolysiloxanes chemically modified with a functional group, such as acryl-denatured, epoxy-denatured, alky-denatured, amino-denatured, carboxyl-denatured, alcohol-denatured, fluorine-denatured, alkylallylpolyether-denatured, or epoxypolyether-denatured. Among these, an acryl-denatured organopolysiloxane is preferable, and particularly preferred is a graft polymer of organopolysiloxane with an acrylic acid ester or a mixture of acrylic acid and a copolymerizable monomer.

The acrylic acid ester graft polymerizable with organopolysiloxane can be an alkyl acrylate such methyl acrylate, ethyl acrylate, propyl acrylate, butyl acrylate, hexyl acrylate, pentyl acrylate, octyl acrylate, 2-ethylhexyl acrylate, lauryl acrylate, or stearyl acrylate; an alkoxyalkyl acrylate such as methoxyethyl acrylate, or butoxyethyl acrylate; cyclohexyl acrylate; phenyl acrylate; or benzyl acrylate, and these may be employed singly or in a combination of two or more kinds.

Also the monomer copolymerizable with the acrylic acid ester can be a hydroxyl-containing unsaturated monomer such as 2-hydroxyethyl (meth)acrylate or 2-hydroxypropyl (meth)acrylate. These may be employed singly or in a combination of two or more kinds.

At the graft polymerization, a proportion of organopolysiloxane and an acrylic acid ester or a monomer copolymerizable with the acrylic acid ester is preferably, in a mass ratio of [organopolysiloxane/acrylic acid ester or monomer copolymerizable with acrylic acid ester], within a range from 9/1 to 1/9, more preferably 8/2 to 2/8. Examples of the acryl-denatured organopolysiloxane include "X-22-8171" (trade name) manufactured by Shin-Etsu Chemical Co., Ltd. and "Chaline R-2" (trade name) manufactured by Nissin Chemical Industry Co.

A content of the denatured organopolysiloxane, for a sum of the oil-extended rubber, the olefinic resin and the post-added softening agent taken as 100 parts by mass, is preferably 0.2 to 20 parts by mass, 0.5 to 15 parts by mass, particularly preferably 1 to 10 parts by mass. The denatured organopolysiloxane functions, rather than providing a slidability, as a mutual dissolving agent for the polymer composition and the undenatured organopolysiloxane in the polysiloxane-containing composition [D]. Therefore, a content of the denatured organopolysiloxane less than 0.2 parts by mass cannot provide a sufficient mutual solubility, thus resulting in a defective dispersion of the undenatured organopolysiloxane and the polymer composition in a kneader, or deteriorating a moldability such as in extrusion molding or injection molding. On the other hand, a content exceeding 20 parts by mass tends to deteriorate the flexibility and the mechanical properties.

The polysiloxane-containing composition [D], having excellent rubber elasticity and thermoplastic property, can be easily worked with an ordinary molding method for thermoplastic resin, such as injection molding, extrusion molding, blow molding, compression molding, vacuum molding, laminate molding or calender molding. Also a secondary working such as foaming, drawing, adhesion, printing, painting or plating can be easily executed if necessary. Therefore, the polysiloxane-containing composition [D] can be widely applicable not only to composite articles having an injection fused portion but also to ordinary worked articles. For example it is useful in automotive external and internal surface materials such as a bumper, an external lace, a window sealing gasket, a door sealing gasket, a trunk sealing gasket, a roofside rail, an emblem, and internal/external surface materials, sealants or internal/external surface materials for aircraft and ship, sealants, internal/external surface materials or waterproof sheet materials for construction and building, sealants for general machinery and apparatus, a packing or a housing for consumer electric appliances, household goods, sporting goods or the like.

[5] Crosslinking Agent

A crosslinking agent to be employed in crosslinking can be similar in any of the specific-size rubber particle-containing composition [A], the acrylate resin-containing composition [B], the maleimide compound-containing composition [C], and the polysiloxane-containing composition [D]. Examples of the crosslinking agent include an organic peroxide, a phenolic resin crosslinking agent, sulfur, a sulfur compound, p-quinone, a p-quinonedioxime derivative, a bismaleimide compound, an epoxy compound, a silane compound, an amino resin, a polyol crosslinking agent, a polyamine, a triazine compound and a metal soap, among which an organic peroxide and a phenolic resin crosslinking agent are preferred.

The organic peroxide preferably a 1-minute half-period temperature $T_h$ (° C.) within a range of $T_m \leq T_h \leq T_m+50$ (° C.) in which $T_m$ is a melting point (° C.) of the polyolefinic resin to be employed. A $T_h$ lower than $T_m$ initiates a crosslinking reaction before the rubber and the olefinic resin are sufficiently melted and kneaded, thereby deteriorating the rubber elasticity and the mechanical strength of the thermoplastic elastomer composition. On the other hand, a $T_h$ exceeding $T_m+50$ (° C.) results in a deficient crosslinking because of an excessively low crosslinking temperature, thereby tending to reduce the rubber elasticity and the mechanical strength of the thermoplastic elastomer composition.

Examples of the organic peroxide include 1,3-bis(t-butylperoxyisopropyl)benzene, 2,5-dimethyl-2,5-bis(t-butylperoxy)hexine-3, 2,5-dimethyl-2,5-bis(t-butylperoxy)hexene-3, 2,5-dimethyl-2,5-bis(t-butylperoxy)hexane, 2,2'-bis(t-butylperoxy)-p-isopropylbenzene, dicumyl peroxide, di-t-butyl peroxide, t-butyl peroxide, p-menthane peroxide, 1,1-bis(t-butylperoxy)-3,3,5-trimethylcyclohexane, dilauroyl peroxide, diacetyl peroxide, t-butyl peroxybenzoate, 2,4-dichlorobenzoyl peroxide, p-chlorobenzoyl peroxide, benzoyl peroxide, di(t-butylperoxy) perbenzoate, n-butyl-4,4-bis(t-butylperoxy) valerate, and t-butylperoxyisopropyl carbonate. Among these, there is preferred a compound with a relatively high decomposition temperature such as 1,3-bis(t-butylperoxyisopropyl)benzene, 2,5-dimethyl-2,5-bis(t-butylperoxy)hexine-3, or 2,5-dimethyl-2,5-bis(t-butylperoxy)hexane. These may be employed singly or in a combination of two or more kinds.

Also in case of employing an organic peroxide as a crosslinking agent, an auxiliary crosslinking agent may be utilized to execute the crosslinking reaction in a milder manner, thereby obtaining a particularly uniform crosslinked structure. Examples of the auxiliary crosslinking agent include a sulfur compound such as sulfur, powdered sulfur, colloidal sulfur, precipitated sulfur, insoluble sulfur, surface-treated sulfur or dipentamethylene thiuram tetrasulfide; an oxime compound such as p-quinone oxime, or p,p'-dibenzoylquinone oxime; and a polyfunctional monomer such as ethylene glycol di(meth)acrylate, diethylene glycol di(meth)acrylate, triethylene glycol di(meth)acrylate, tetraethylene glycol di(meth)acrylate, polyethylene glycol di(meth)acrylate, trimethylolpropane tri(meth)acrylate, diallyl phthalate, tetraallyloxy ethane, triallyl cyanurate, N,N'-m-phenylene bismaleimide, N,N'-toluylene bismaleimide, maleic anhydride, divinylbenzene, or zinc di(meth)acrylate. Among these, p,p'-dibenzoylquinone oxime, N,N'-m-phenylene bismaleimide and divinylbenzene are particularly preferable. These may be employed singly or in a combination of two or more kinds. Also among these auxiliary crosslinking agent, N,N'-m-phenylene bismaleimide has a function as a crosslinking agent and can also be used as a crosslinking agent.

In case of employing an organic peroxide as the crosslinking agent, an amount of use, taking the polymer composition as 100 parts by mass, is preferably 0.05 to 10 parts by mass, particularly 0.1 to 5 parts by mass. A content of the organic peroxide less than 0.05 parts by mass may result in a deficient crosslinking degree, thereby reducing the rubber elasticity and the mechanical strength of the thermoplastic elastomer composition. On the other hand, a content exceeding 10 parts by mass tends to result in an excessively high crosslinking degree, thereby deteriorating the moldability or reducing the mechanical properties.

In case of employing an organic peroxide as the crosslinking agent, an amount of the auxiliary crosslinking agent, for the polymer composition taken as 100 parts by mass, is preferably 10 parts by mass or less, particularly preferably 0.2 to 5 parts by mass. A content of the auxiliary crosslinking agent exceeding 10 parts by mass tends to result in an excessively high crosslinking degree, thereby deteriorating the moldability and the mechanical properties.

Also a phenolic crosslinking agent can be a p-substituted phenol compound represented by a following general formula (I), an o-substituted phenol-aldehyde condensate, a m-substituted phenol-aldehyde condensate, or a brominated alkylphenol-aldehyde condensate, among which a p-substituted phenol compound is particularly preferable.

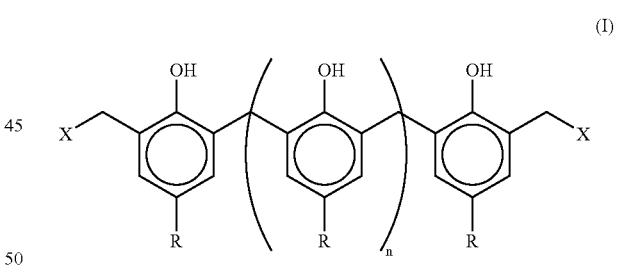

wherein n represents an integer from 0 to 10; X represents a hydroxyl group, a halogenated alkyl group or a halogen atom; and R represents a saturated hydrocarbon group with 1 to 15 carbon atoms.

The p-substituted phenol compound can be obtained by a condensation reaction of a p-substituted phenol and an aldehyde (preferably formaldehyde) in the presence of an alkali catalyst.

In case of employing a phenolic crosslinking agent as the crosslinking agent, it is preferably employed, for the polymer composition taken as 100 parts by mass, in 0.2 to 10 parts by mass, particularly preferably 0.5 to 5 parts by mass. A content of the phenolic crosslinking agent less than 0.2 parts by mass may result in a deficieint crosslinking degree, thus reducing the rubber elasticity and the mechanical strength of the thermoplastic elastomer composition. On the other hand, a content exceeding 10 parts by mass tends to deteriorate the moldability of the thermoplastic elastomer composition.

Such phenolic crosslinking agent may be employed singly, but a crosslinking accelerator may be employed in combination in order to regulate a crosslinking rate. Such crosslinking accelerator can be a metal halide such as stannous chloride or ferric chloride, or an organic halide such as chlorinated polypropylene, brominated butyl rubber, or chloroprene rubber.

In addition to the crosslinking accelerator, it is desirable to employ, in combination, a dispersant for example a metal oxide such as zinc oxide, or stearic acid.

[6] Other Additives

In each of the specific-size rubber particle-containing composition [A], the acrylate resin-containing composition [B], the maleimide compound-containing composition [C], and the polysiloxane-containing composition [D], there may be added other additives according to the necessity, for example a lubricant; a stabilizer such as an antiaging agent, a thermal stabilizer, an antiweathering agent, a metal deactivator, an ultraviolet absorber, a photostabilizer, or a copper poisoning inhibitor; an auxiliary working agent, a release agent, a flame retardant, an antistatic agent, an antibacterial/antimold agent, a dispersant, a platicizer, a crystal nucleating agent, a flame retardant, a stickiness provider, an auxiliary foaming agent, a colorant such as titanium oxide or carbon black, a metal powder such as ferrite, inorganic fibers such as glass fibers or metal fibers, organic fibers such as carbon fibers or aramide fibers, composite fibers, inorganic whiskers such as potassium titanate whiskers, a filler such as glass beads, glass balloons, glass flakes, asbestos, carbon black, mica, calcium carbonate, magnesium carbonate, clay, caolin, talc, wet-process silica, dry-process silica, talc, calcium silicate, hydrotalcite, caolin, diatomaceous earth, graphite, pumice, ebonite powder, cotton flock, cork powder, barium sulfate, fluorinated resin, polymer beads, natural silicate, or synthetic silicate or a mixture thereof, a filler such as polyolefin wax, cellulose powder, fluorine powder, silicone powder, rubber powder or wood powder, silicone oil or a low-molecular polymer.

[7] Method for Producing Thermoplastic Elastomer Composition

The specific-sized rubber particle-containing composition [A], the acrylate resin-containing composition [B], the maleimide compound-containing composition [C], and the polysiloxane-containing composition [D] (these compositions [A] to [D] may hereinafter be collectively called "thermoplastic elastomer composition") can be produced by similar methods.

(1) A Producing Method Utilizing a Batch-type Closed Kneader and a Continuous Extruder The thermoplastic elastomer composition can be produced by mixing and kneading a polymer composition including a rubber and a polyolefinic resin, at least a part of a crosslinking agent and other additives if necessary, in a batch-type closed kneader to obtain a dispersed blend, and then dynamically crosslinking such blend in a continuous extruder such as a two-shaft extruder. It can also be produced by mixing and dispersing a polymer composition including a rubber and a polyolefinic resin, and other additives excluding a crosslinking agent if necessary in a batch-type closed kneader to obtain a blend, and then dynamically crosslinking a composition including such blend, a crosslinking agent and other components if necessary in a continuous extruder such as a two-shaft continuous extruder. Such "dynamic crosslinking" means a crosslinking under both a shearing force and a heating. Also the mixing step for mixing and dispersion, and the crosslinking step for dynamic crosslinking may be executed in continuation.

1) Batch-type Closed Kneader

The aforementioned closed kneader can be, for example, a pressurized kneader, a Banbury mixer or a Brabender mixer.

In case of mixing and dispersing the polymer composition with a closed kneader, a method of supplying the softening agent is not particularly limited, and the softening agent may be blended in advance in the polymer composition or may be supplied, separately from the polymer composition, to closed kneader. It is also possible to supply the softening agent after the mixing and dispersion of the polymer composition, or to utilize an oil-extended rubber.

Also, particularly in the preparation of the polysiloxane-containing composition [D], in case of melt kneading the polymer composition without the crosslinking agent in the closed kneader, the undenatured and denatured organopolysiloxanes and the softening agent may be mixed in advance with the polymer composition, or respectively supplied to the closed kneader without mixing in advance, and a procedure is not particularly restricted. Also the undenatured organopolysiloxane, the denatured organopolysiloxane and the softening agent may be added after the melt kneading of the polymer composition or may be charged in the closed kneader from the beginning together with the polymer composition for melt kneading, and such procedure is not particularly restricted.

Also, for charging the blend prepared in the closed kneader into the continuous extruder, the blender is preferably cut in advance into small pieces. The small pieces may be prepared by pellet formation with a feeder-ruder or by forming a sheet with a roll mill and forming pellets with a sheet pelletizer, and a method for cutting the blend is not particularly limited.

2) Continuous Extruder

The continuous extruder is not particularly limited, and can be a one-shaft extruder, a two-shaft extruder or a two-shaft rotary extruder, however there is preferred a two-shaft extruder, particularly preferably with an L/D ratio (ratio of effective screw length L and external diameter D) equal to or larger than 30, further preferably 36 to 60. Such two-shaft extruder can be of any type, for example with mutually meshing two screws or with two screws without meshing. There is more preferred an extruder in which two screws have a same rotating direction and are mutually meshing. Examples of such two-shaft extruder include GT manufactured by Ikegai Ltd., KTX manufactured by Kobe Steel Ltd., TEX manufactured by Japan Steel Work Co., TEM manufactured by Toshiba Machinery Co. and ZSK manufactured by Warner Inc. (foregoing all trade names).

In case of producing the thermoplastic elastomer composition by dynamic crosslinking with a continuous extruder, the crosslinking agent may be supplied for example by a method of mixing it by a blend mixer in advance with a blend to be subjected to the crosslinking reaction and then supplying the mixture to the continuous extruder, or a method of supplying from a barrel aperture provided between a feed hopper and a die, and such supplying method is not particularly restricted.

Also a method of adding the filler or the like. is not particularly limited, and they may be added in the closed kneader, or in the continuous extruder, or in both.

A condition of the dynamic crosslinking process is variable depending on the melting point of the employed olefinic resin and the kind of the crosslinking agent, however a process temperature is preferably within a range from a melting point ($T_m$) of the olefinic resin to 250° C. A temperature lower than the melting point of the olefinic resin is unable to sufficiently melt and knead the rubber and the olefinic resin, thereby resulting in an insufficient kneading to eventually deteriorate the mechanical properties of the thermoplastic elastomer composition. On the other hand, a temperature exceeding 250° C. tends to cause a deterioration in the rubber, thereby reducing the mechanical properties of the thermoplastic elastomer composition.

(2) A Producing Method Utilizing a Continuous Two-Shaft Kneader With Different Rotating Directions and a Two-Shaft Extruder With a Same Rotating Direction The thermoplastic elastomer composition can also be produced by supplying a polymer composition including a rubber and an olefinic resin to an extrusion apparatus constituted of a serial connection of an upstream continuous two-shaft kneader with different rotating directions and a downstream two-shaft extruder with a same rotating direction, from a raw material introducing part of the continuous two-shaft kneader with different rotating directions thereby mixing and dispersing the raw material composition in the continuous two-shaft kneader with different rotating directions, and supplying the kneaded substance, with a temperature of the kneaded substance maintained at 250° C. or less at an exit of the continuous two-shaft kneader with different rotating directions, to the two-shaft extruder with a same rotating direction thereby executing a dynamic crosslinking.

In this producing method, the continuous two-shaft kneader with different rotating directions executes a melt kneading of the supplied polymer composition and a mixing and a dispersion of the crosslinking agent, and a kneaded substance controlled at a predetermined temperature or lower is supplied to the two-shaft extruder with a same rotating direction to complete a dynamic crosslinking reaction. A temperature of the kneaded substance at the exit of the continuous two-shaft kneader with different rotating directions is variable depending on the kind of the employed olefinic resin and the crosslinking agent, however it has to be controlled at a temperature capable of executing the melt kneading of the polymer composition in the continuous two-shaft kneader with different rotating directions in a state of suppressing the proceeding of the crosslinking reaction, and is maintained at 250° C. or lower in order to prevent deterioration of the rubber and the olefinic resin contained in the polymer composition.

Also the thermoplastic elastomer composition can be produced by supplying a polymer composition including a rubber, an olefinic resin and an organic peroxide having a 1-minute half-period temperature $T_h$ (° C.) within a range of $T_m \leq T_h \leq T_m + 50$ (° C.) in which $T_m$ is a melting point (° C.) of the olefinic resin, to an extrusion apparatus constituted of a serial connection of an upstream continuous two-shaft kneader with different rotating directions and a downstream two-shaft extruder with a same rotating direction, from a raw material introducing part of the continuous two-shaft kneader with different rotating directions thereby mixing and dispersing the polymer composition in the continuous two-shaft kneader with different rotating directions, and, with a temperature ($t_a$) of the kneaded substance maintained within a range of $T_h - 30 \leq t_a \leq T_h + 30$ (° C.) at an exit of the continuous two-shaft kneader with different rotating directions and executing a dynamic crosslinking in the two-shaft extruder with a same rotating direction.

In this producing method, the continuous two-shaft kneader with different rotating directions executes a melt kneading of the supplied polymer composition and a mixing and a dispersion of the crosslinking agent, and a kneaded substance controlled at a predetermined temperature or lower is supplied to the two-shaft extruder with a same rotating direction to complete a dynamic crosslinking reaction. A temperature $t_a$ of the kneaded substance at the exit of the continuous two-shaft kneader with different rotating directions is variable depending on the kind of the employed olefinic resin and the crosslinking agent, however it has to be controlled at a temperature capable of executing the melt kneading of the polymer composition in the continuous two-shaft kneader with different rotating directions in a state of suppressing the proceeding of the crosslinking reaction. Therefore, the temperature has to be equal to or lower than a temperature capable of suppressing the proceeding of the crosslinking reaction. In case of employing at least an organic peroxide as the crosslinking agent, for a 1-minute half-period temperature $T_h$, there is required a range of $T_h - 30 \leq t_a \leq T_h + 30$ (° C.) [preferably $T_h - 20 \leq t_a \leq T_h + 25$ (° C.) and more preferably $T_h - 10 \leq t_a \leq T_h + 20$ (° C.)]. In case the kneaded substance at the exit of the continuous two-shaft kneader with different rotating directions has a temperature $t_a$ exceeding $T_h + 30$ (° C.), the kneaded substance is supplied, in a state wherein a crosslinking reaction has proceeded rapidly or has been completed in the continuous two-shaft kneader with different rotating directions, to the two-shaft extruder with a same rotating direction, whereby the thermoplastic elastomer composition is deteriorated in the mechanical properties and the moldability. On the other hand, a temperature $t_a$ less than $T_h - 30$ (° C.) results in an insufficient melt kneading, thus deteriorating the mechanical strength of the thermoplastic elastomer composition.

Examples of the continuous two-shaft kneader with different rotating directions include CIM manufactured by Japan Steel Work Co., Mixtron FCM/NCM/LCM/ACM manufactured by Kobe Steel Ltd. (foregoing being all trade names).

The two-shaft extruder with a same rotating direction is not particularly restricted, but preferably is a two-shaft extruder preferably with an L/D ratio (ratio of effective screw length L and external diameter D) equal to or larger than 30, more preferably 36 to 60.

The crosslinking agent is not particularly limited in a supplying method, and can be supplied in a mixed with the polymer composition and/or in a mixing and dispersing step, and more specifically, there can be adopted 1) a method of mixing it by a blend mixer in advance with the polymer composition to be subjected to the crosslinking reaction and then supplying the mixture to the continuous two-shaft kneader with different rotating directions, or 2) a method of supplying from a feed hopper of the continuous two-shaft kneader with different rotating directions. Also there may be employed 3) a method of supplying from a barrel aperture provided between a feed hopper of the continuous two-shaft kneader with different rotating directions and the exit of the kneader.

In case of producing the thermoplastic elastomer composition in a connected apparatus, a supplying method for the softening agent, the filler or the like. is also not particularly restricted, and there may be employed 1) a method of mixing in advance by a blend mixer with the rubber and the olefinic resin to be subjected to the crosslinking reaction and then supplying the mixture to the continuous two-shaft kneader with different rotating directions, 2) a method of supplying from a feed hopper of the continuous two-shaft kneader with different rotating directions, the two-shaft extruder with a same rotating direction or both, 3) a method of supplying from a barrel aperture provided between a feed hopper and a die of the continuous two-shaft kneader with different rotating directions, the two-shaft extruder with a same rotating direction or both, or 4) a method of supplying to the two-shaft extruder with a same rotating direction utilizing a side feeder.

Also, in the preparation of the polysiloxane-containing composition [D], in case of producing the thermoplastic elastomer composition with a continuous extruder, the undenatured and denatured organopolysiloxanes may be supplied, in case of powder, by a method of mixing in advance by a mixer with the polymer composition to be subjected to the crosslinking reaction and then supplying the mixture to the continuous extruder, and, in case of liquid, by a method of mixing in advance by a mixer with the polymer composition to be subjected to the crosslinking reaction and then supplying the mixture to the continuous extruder, or by a method of supplying from a barrel aperture provided between a feed hopper and a die.

Also a pelletizing of the thermoplastic elastomer composition produced by these methods can be realized by a known pelletizing apparatus such as a strand cut, an underwater cut, a mist cut or a hot cut and is not particularly limited.

BEST MODE FOR CARRYING OUT THE INVENTION

In the following, the present invention will be explained in more details by examples, however the present invention is not restricted by such examples unless the scope of the invention is exceeded.

1. Example on the Specific-Size Rubber Particle-containing Composition [A]

Rubber, crystalline olefinic resin, amorphous olefinic resin, softening agent, crosslinking agent or the like. employed as raw materials were as follows.

[1] Raw Materials (1) Rubber

1) EPDM (a11): ethylene/propylene/5-ethylidene-2-norbornene ternary copolymer rubber, ethylene content: 66 mass %, 5-ethylidene-2-norbornene content: 4.5 mass %, a limiting viscosity measured at 135° C. in decaline: 4.7 dl/g, a mineral oil type softening agent (trade name Diana Process Oil PW-380, manufactured by Idemitsu Kosan Co. Ltd.,) content: 50 mass %;

2) EPDM (a12): ethylene/propylene/5-ethylidene-2-norbornene ternary copolymer rubber, ethylene content: 66 mass %, 5-ethylidene-2-norbornene content: 4.5 mass %, a limiting viscosity measured at 135° C. in decaline: 3.8 dl/g, a mineral oil type softening agent (trade name Diana Process Oil PW-380, manufactured by Idemitsu Kosan Co., Ltd.) content: 40 mass %;

3) EPDM (a13): ethylene/propylene/5-ethylidene-2-norbornene ternary copolymer rubber, ethylene content: 66 mass %, 5-ethylidene-2-norbornene content: 4.5 mass %, a limiting viscosity measured at 135° C. in decaline: 2.8 dl/g, a mineral oil type softening agent (trade name Diana Process Oil PW-380, manufactured by Idemitsu Kosan Co., Ltd.) content: 20 mass %.

(2) Olefinic Resin

1) Crystalline olefinic resin (b11): a propylene polymer, density: 0.90 g/cm$^3$, MFR (temperature 230° C., load 2.16 kgs): 5 g/10 minutes, (trade name Novatec PP MA4, manufactured by Nippon Polychem Co.);

2) Crystalline olefinic resin (b12): a propylene/ethylene random copolymer, density: 0.90 g/cm$^3$, MFR (temperature 230° C., load 2.16 kgs): 3 g/10 minutes, (trade name Novatec PP BC5CW, manufactured by Nippon Polychem Co.);

3) Crystalline olefinic resin (b13): a propylene/ethylene random copolymer, density: 0.90 g/cm$^3$, MFR (temperature 230° C., load 2.16 kgs): 23 g/10 minutes, (trade name Novatec PP FL25R, manufactured by Nippon Polychem Co.);

4) Amorphous olefinic resin (b2): a propylene/1-butene amorphous copolymer; propylene content: 71 mol %, melt viscosity: 8 Pa·s, density: 0.87 g/cm$^3$, Mn: 6500, (trade name APAO UT2780, manufactured by Ube Industries Ltd.);

(3) Mineral oil type softening agent (g1): hydrogenated paraffin oil (trade name Diana Process Oil PW 380, manufactured by Idemitsu Kosan Co., Ltd);

(4) Crosslinking Agent

1) Crosslinking agent (h1): 2,5-dimethyl-2,5-bis(t-butylperoxy)hexane-3, 1-minute half-period temperature: 194.3° C. (trade name Perhexa 25B-40, manufactured by NOF Corp.);

2) Crosslinking agent (h2): 2,5-dimethyl-2,5-bis(t-butylperoxy)hexine-3, 1-minute half-period temperature: 179.8° C. (trade name Perhexine 25B-40, manufactured by NOF Corp.);

3) Crosslinking agent (h3): divinylbenzene (purity 55%), (manufactured by Sankyo Kasei Co.);

(5) Antiaging agent (j1): trade name Irganox 1010 (manufactured by Ciba Specialty Chemicals Co.);

(6) Lubricant [silicone oil (k1)]: organopolydimethylsiloxane (trade name SH-200(100 cSt), manufactured by Toray Dow Corning Silicone Ltd.).

[2] Production of Specific-Sized Rubber Particle-containing Composition [A]

(1) Producing Method With a Closed Kneader+a Continuous Extruder (Producing Method 1)

EXAMPLES 1, 3 AND 5

A raw material composition of a formulation shown in Table 1 excluding a crosslinking agent was charged in a pressurized kneader (manufactured by Moriyama Company Ltd.) heated to 150° C., and was kneaded for 15 minutes at 40 rpm until the components were uniformly dispersed. Then the composition in a melting state was pelletized with a feeder-ruder (manufactured by Moriyama Company Ltd.) set at 180° C. and 40 rpm. The obtained pellets were added with crosslinking agents (h1)-(h3) of a formulation shown in Table 1 and were mixed for 30 seconds in a Henshel mixer. Then the mixture was supplied by a weight type feeder (trade name KF-C88, manufactured by Kubota Co.) with a discharge amount of 40 kg/hr to a two-shaft extruder (non-meshing screws in a same direction, L/D (external diameter 45 mm, ratio of effective screw length L and external diameter D)=38.5, trade name PCM-45, manufactured by Ikegai Ltd.) and was extruded under dynamically heat-treating with a cylinder temperature setting at 200° C. and a screw revolution of 300 rpm to produce a specific-sized rubber particle-containing composition [A].

(2) Producing Method With a Two Connected Apparatuses of a Continuous Two-Shaft Kneader With Different Rotating Directions+a Two-Shaft Extruder With a Same Rotating Direction (Producing Method 2)

EXAMPLES 2, 4 AND 6 AND COMPARATIVE EXAMPLE 4

A raw material composition of a formulation shown in Table 1 was mixed for 30 seconds in a Henshel mixer. Then the mixed raw material composition was supplied with two weight type feeders (trade name KF-C88, manufactured by Kubota Co.) with a discharge amount of 40 kg/hr to an apparatus formed by connecting an upstream continuous two-shaft kneader with different rotating directions (two meshing rotors in different directions, L/D=10, trade name Mixtron LCM, manufactured by Kobe Steel Ltd.) and a downstream two-shaft extruder with a same rotating direction (non-meshing screws in a same direction, L/D=42, trade name TEX 44SS, manufactured by Japan Steel Work Co.) from a raw material inlet of the continuous two-shaft kneader with different rotating directions, and was melted and kneaded under a cylinder temperature setting of 80° C., a rotor revolution of 350 to 800 rpm, a gate aperture of 1 to 40% and an orifice aperture of 100%. Then the composition in the melting state was supplied to the two-shaft extruder with a same rotating direction directly connected to the continuous two-shaft kneader with different rotating directions and was subjected to a crosslinking reaction by dynamically heat-treating with a cylinder temperature setting of 200° C. and a screw revolution of 400 rpm to obtain a specific-sized rubber particle-containing composition [A]. The mineral oil type softening agent was pressed in from a cylinder of a first kneading rotor of the continuous two-shaft kneader with different rotating directions.

(3) Producing Method Utilizing a Continuous Extruder (Producing Method 3)

COMPARATIVE EXAMPLES 1 TO 3

A raw material composition of a formulation shown in Table 1 was mixed for 30 seconds in a Henshel mixer. Then a rubber and an olefinic resin, added with various additives, were supplied with two weight type feeders (trade name KF-C88, manufactured by Kubota Co.) with a discharge amount of 40 kg/hr to a two-shaft extruder (non-meshing screws in a same direction, L/D=38.5, trade name PCM-45, manufactured by Ikegai Ltd.) and were extruded under dynamically heat-treating with a cylinder temperature setting of 200° C. and a screw revolution of 300 rpm, to obtain a specific-sized rubber particle-containing composition [A].

In the productions with these three producing methods, a temperature of the blend at the exit of the continuous two-shaft kneader with different rotating directions and a temperature of the blend at the exit of the two-shaft extruder with a same rotating direction were measured by a non-contact thermometer (trade name: PT-3LF, manufactured by Optex Co.).

[3] Evaluation of the Specific-Sized Rubber Particle-containing Composition [A]

Following items were measured in order to evaluate the obtained specific-sized rubber particle-containing compositions [A]:

(1) melt flow rate (MFR): measured at 230° C. and a load of 10 kg;

(2) hardness: measured according to JIS K 6253;

(3) tensile strength at break and tensile elongation at break: measured according to JIS K 6251;

(4) permanent compression set: measured according to JIS K 6262;

(5) extrusion workability: A labplast mill extruder (external diameter=20 mm, L/D=25, manufactured by Toyo Seiki Co.) was used to extrude a flat slab (lip width: 25 mm, thickness: 1.5 mm) under following conditions and an appearance was visually evaluated. An article with a smooth surface and an edge was evaluated as "○", and any other article was evaluated as "X".

(setting of labplast mill extruder)

cylinder C1: 180° C.

cylinder C2: 190° C.

cylinder C3: 210° C.

die: 205° C.

screw revolution: 40 rpm.

(6) Particles

As an index of melt kneading, "particles" of the specific-sized rubber particle-containing composition [A] were measured. The "particles" mean visible giant gel particles, an unmelted olefinic rein, or fish-eyes, generated in the production of the specific-sized rubber particle-containing composition [A], by a lack of sufficient melt kneading of the rubber and the olefinic resin in the dynamically treating in the presence of the crosslinking agent. The "particles" were evaluated by forming the specific-sized rubber particle-containing composition [A] into a thin sheet by electrically heated type 6 inch rolls (manufactured by Kansai Roll Co.) under a setting of a temperature of 180° C. and a gap of rolls of 0.5 mm, and a number of the "particles" present in a sheet of 20×20 cm was visually counted. Criteria of evaluation were as follows:

0 to less than 30: very few 30 to less than 100: few 100 or more: many (7) Gel Fraction: Measured by the Aforementioned Method.

(8) TEM Photograph

A TEM photograph of the specific-sized rubber particle-containing composition [A] was obtained by forming a thin slice of a specific-sized rubber particle-containing composition [A] with a frozen microtome, dyeing it with ruthenium tetroxide, and photographing the dyed slice with a magnification of 2000 times under a transmission electron microscope (trade name H-7500, manufactured by Hitachi Ltd.).

In the image analysis of the TEM photograph, an image analysis software Image-Pro Plus Ver. 4.0 for Windows (manufactured by Media Cybernetics Inc.) was used to obtain areas of crosslinked rubber particles.

Based on the areas of the determined crosslinked rubber particles, the aforementioned equations were used to determine a number-averaged particle diameter dn and a volume-averaged particle diameter dv, and dv/dn was calculated from these values.

TABLE 1

| Oil-extended rubber | Limiting viscosity (dl/g) | Mineral oil softening agent content (mass %) | Example 1 | Example 2 | Example 3 | Example 4 | Example 5 | Example 6 | Comparative Example 1 | Comparative Example 2 | Comparative Example 3 | Comparative Example 4 |
|---|---|---|---|---|---|---|---|---|---|---|---|---|
| oil-extended EPDM (a11) | 4.7 | 50 | — | — | — | — | 75(37.5) | 75(37.5) | — | — | 75(37.5) | — |
| oil-extended EPDM (a12) | 3.8 | 40 | 80(48) | 80(48) | — | — | — | — | 80(48) | — | — | 80(48) |
| oil-extended EPDM (a13) | 2.8 | 20 | — | — | 75(60) | 75(60) | — | — | — | 75(60) | — | — |
| crystalline olefinic resin (b11) | | | — | — | 25 | 25 | — | — | — | 25 | — | — |
| crystalline olefinic resin (b12) | | | 20 | 20 | — | — | — | — | 20 | — | — | 20 |
| crystalline olefinic resin (b13) | | | — | — | — | — | 7 | 7 | — | — | 7 | — |
| amorphous olefinic resin (b2) | | | — | — | — | — | 7 | 7 | — | — | 7 | — |
| post-addition mineral oil type softening agent (g1) | | | — | — | — | — | 11 | 11 | — | — | 11 | — |
| softening agent content (mass parts) with rubber as 100 parts | | | 66.7 | 66.7 | 25 | 25 | 129 | 129 | 66.7 | 25 | 129 | 66.7 |
| content (mass part) with sum of rubber and olefinic resins as 100 parts | EPDM | | 70.6 | 70.6 | 70.6 | 70.6 | 72.8 | 72.8 | 70.6 | 70.6 | 70.6 | 70.6 |
| | total olefinic resins | | 29.4 | 29.4 | 29.4 | 29.4 | 27.2 | 27.2 | 29.4 | 29.4 | 27.2 | 29.4 |
| crosslinking agent (h1) | | | 1 | 1 | — | — | — | — | — | — | — | 1 |
| crosslinking agent (h2) | | | — | — | 0.7 | 0.7 | 1 | 1 | — | 0.7 | 1 | — |
| crosslinking agent (h3) | | | 1.2 | 1.2 | 0.7 | 0.7 | 1.2 | 1.2 | 1.2 | 0.7 | 1.2 | 1.2 |
| total crosslinking agents (mass part) with sum of rubber and olefinic resin as 100 mass parts | | | 3.2 | 3.2 | 1.6 | 1.6 | 4.3 | 4.3 | 1.8 | 1.6 | 4.3 | 3.2 |
| antiaging agent (j1) | | | 0.1 | 0.1 | 0.1 | 0.1 | 0.1 | 0.1 | 0.1 | 0.1 | 0.1 | 0.1 |
| silicone oil (k1) | | | 0.2 | 0.2 | 0.2 | 0.2 | 0.2 | 0.2 | 0.2 | 0.2 | 0.2 | 0.2 |
| producing method | | | 1 | 2 | 1 | 2 | 1 | 2 | 3 | 3 | 3 | 2 |
| gate aperture (%) of continuous two-shaft kneader with difference rotating directions | | | — | 40 | — | 15 | — | 1 | — | — | — | 10 |
| orifice aperture (%) of continuous two-shaft kneader with difference rotating directions | | | — | 100 | — | 100 | — | 100 | — | — | — | 30 |
| rotor revolution (rpm) of continuous two-shaft kneader with difference rotating directions | | | — | 750 | — | 350 | — | 800 | — | — | — | 500 |
| blend temperature (° C.) at exit of continuous two-shaft kneader with difference rotating directions | | | — | 194 | — | 196 | — | 169 | — | — | — | 261 |
| blend temperature (° C.) at exit of two-shaft extruder with a same rotating directions | | | 225 | 222 | 266 | 275 | 251 | 247 | 246 | 273 | 244 | 251 |
| <physical properties> MFR (g/10 min) | | | 25 | 10 | 17 | 10 | 75 | 120 | 46 | 25 | 143 | 5 |
| hardness (type A durometer) | | | 73 | 75 | 86 | 87 | 49 | 50 | 73 | 87 | 49 | 75 |
| tensile strength at break (MPa) | | | 8.1 | 9.9 | 9.8 | 9.9 | 3.9 | 4.3 | 7 | 9.2 | 3.2 | 5.4 |
| tensile elongation at break (%) | | | 600 | 640 | 650 | 670 | 620 | 650 | 590 | 630 | 600 | 530 |
| permanent compression set (%) | | | 38 | 34 | 45 | 49 | 38 | 33 | 45 | 56 | 40 | 39 |
| extrusion workability | | | ○ | ○ | ○ | ○ | ○ | ○ | X | X | X | X |
| particle | | | few | very few | few | very few | few | few | many | many | many | many |
| gel fraction (%) | | | 97.4 | 98.7 | 97.8 | 98.9 | 99.4 | 99.3 | 97.9 | 98.5 | 99.1 | 98.1 |
| Image analysis of TEM photograph | number-averaged particle size dn (μm) | | 0.773 | 0.567 | 0.672 | 0.598 | 0.729 | 0.644 | 1.304 | 1.228 | 1.173 | 2.134 |
| | volume-averaged particle size dv (μm) | | 1.016 | 0.722 | 0.885 | 0.718 | 0.938 | 0.759 | 2.127 | 1.998 | 1.862 | 3.677 |
| | dv/dn | | 1.314 | 1.273 | 1.317 | 1.201 | 1.287 | 1.179 | 1.631 | 1.627 | 1.587 | 1.723 |

Parenthesized number in oil-extended EPDM column indicates EPDM content (parts by mass).

[4] Result of Example

Based on Table 1, the specific-sized rubber particle-containing compositions [A] (Examples 1, 3 and 5) obtained by the producing method 1 were excellent in the physical properties and the extruding workability, and molded articles showed few particles. Among the specific-sized rubber particle-containing compositions [A] produced by the producing method 2, the Comparative Example 4 had a blend temperature $t_a$ higher than 250° C. at the exit of the continuous two-shaft kneader with different rotating directions, and was inferior in the extrusion workability. Also a molded article showed many particles, a large average particle size of the crosslinked rubber particles and a high dv/dn ratio. On the other hand, the Examples 2, 4 and 6 had a blend temperature $t_a$ lower than 250° C. at the exit of the continuous two-shaft kneader with different rotating directions, and satisfied a relation of $T_h-30 \leq t_a \leq T_h+30$ (° C.) with the 1-minute half-period temperature $T_h$ of the crosslinking agent. Also they were excellent in the extrusion workability and showed few particles in the molded articles, particularly very few in the Examples 2 and 4. Also the number-averaged particle size dn was 0.55 to 0.65 μm, with the dv/dn ratio of 1.18 to 1.27, satisfactory in any example.

While the specific-sized rubber particle-containing compositions [A] produced by the producing method 3 (Comparative Examples 1 to 3) were inferior in the extrusion workability and showed many particles, a large averaged particle size of the crosslinked rubber particles and a high dv/dn ratio.

2. Example on the Acrylate Resin-containing Composition [B]

Rubber, crystalline olefinic resin, amorphous olefinic resin, softening agent, crosslinking agent or the like. employed as raw materials were follows.

[1] Raw Materials (1) ethylene•α-olefin random copolymer rubber (a11): ethylene/propylene/5-ethylidene-2-norbornene ternary copolymer rubber, ethylene content: 66 mass %, 5-ethylidene-2-norbornene content: 4.5 mass %, a limiting viscosity [η] measured at 135° C. in decaline: 4.7 dl/g, a mineral oil type softening agent (trade name Diana Process Oil PW-380, manufactured by Idemitsu Kosan Co., Ltd.) content: 50 mass %;

(2) Olefinic Resin

1) Crystalline olefinic resin (b13): a propylene/ethylene random copolymer, density: 0.90 g/cm$^3$, MFR (temperature 230° C., load 2.16 kgs): 23 g/10 minutes, (trade name Novatec PP FL25R, manufactured by Nippon Polychem Co.);

2) Amorphous olefinic resin (b2): a propylene/1-butene amorphous copolymer; propylene content: 71 mol %, melt viscosity: 8 Pa·s, density: 0.87 g/cm$^3$, Mn: 6500, (trade name APAO UT2780, manufactured by Ube Industries Ltd.);

(3) (Meth)acrylate resin (c1): a methyl methacrylate/methyl acrylate copolymer; density: 1.19 g/cm$^3$, MFR (temperature 230° C., load 3.8 kgs): 8 g/10 minutes, (trade name Parapet G, manufactured by Kuraray Ltd.);

(4) Hydrogenated Diene Polymer (d1)

A hydrogenated diene polymer was synthesized by a following method. Also measurements were made by following methods:

1) vinyl aromatic compound content: measured by an infrared analysis based on a phenyl group absorption at 679 cm$^{-1}$;

2) vinyl bond content of conjugate diene: calculated by Morello method based on infrared analysis;

3) hydrogenation rate: calculated from $^1$H-NMR spectrum at 90 MHz employing carbon tetrachloride as a solvent;

4) weight average molecular weight: calculated by polystyrene conversion, utilizing gel permeation chromatography (GPC) at 38° C., utilizing tetrahydrofuran as a solvent.

Method of Synthesis of Hydrogenated Diene Polymer

In an autoclave with an internal volume of 5 liters, 2.5 kgs of cyclohexane, 15 g of tetrahydrofuran, 110 g of styrene (block A component), and 0.55 g of n-butyl lithium were charged and polymerized at 50° C. to a conversion yield of 98% or higher. Then 220 g of 1,3-butadiene (block B component) were added and polymerized to a conversion yield of 98% or higher, and 110 g of styrene (block A component) were further added and polymerized to a conversion yield of 100%.

After the completion of the polymerization, the reaction liquid was maintained at 70° C., 0.33 g of n-butyl lithium, 0.61 g of t-hydroxy-4-methyl-2-pentanone, 0.21 g of bis (cyclopentadienyl) titanium dichloride and 0.76 g of diethyl aluminum chloride were added and reacted for 1 hour at a hydrogen pressure of 10 kg/cm$^2$ to achieve hydrogenation. The reaction liquid was charged and mixed in a large amount of methyl alcohol, and a precipitated solid was recovered and dried to obtain a block copolymer. This hydrogenated diene polymer (d1) was of A-B-A type, and had a hydrogenation rate of 95%, a 1,2-vinyl bond content in the butadiene unit of the block B of 80%, a mass ratio of block A/block B of 50/50 and a weight average molecular weight of 100,000.

(5) Crosslinking Agent and Auxiliary Crosslinking Agent

1) Crosslinking agent (h1): 2,5-dimethyl-2,5-bis(t-butylperoxy)hexane (trade name Perhexa 25B-40, manufactured by NOF Corp.);

2) Auxiliary crosslinking agent (i1): divinylbenzene (purity 55%), (manufactured by Sankyo Kasei Co.);

3) Auxiliary crosslinking agent (i2): trade name Vulnoc PM (manufactured by Ouchishinko Chemical Industries Co., Ltd.)

(6) Other Additives

1) Antiaging agent (j1): trade name Irganox 1010 (manufactured by Ciba Specialty Chemicals Co.);

2) Silicone oil (k1): organopolydimethylsiloxane, trade name SH-200 (100 cSt), manufactured by Toray Dow-Corning Silicone Co.

EXAMPLE 7

[2] Production of Acrylate Resin-containing Composition [B]

80 parts by mass of ethylene•α-olefin random copolymer rubber (a11), 10 parts by mass of crystalline olefinic resin (b13), 5 parts by mass of amorphous olefinic resin (b2), 5 parts by mass of (meth)acrylate resin (c1), 2 parts by mass of hydrogenated diene polymer (d1), 0.1 parts by mass of antiaging agent (i2), and 0.2 parts by mass of silicone oil (k1) were charged in a dual-arm type pressurized kneader of a volume of 10 liters (manufactured by Moriyama Company Ltd.) heated at 150° C. and kneaded for 20 minutes at 40 rpm. Then the composition in a melting state was pelletized with a feeder-ruder (manufactured by Moriyama Company Ltd.) set at 180° C. and 40 rpm. The obtained pellets were added with 0.5 parts by mass of a crosslinking agent (h2) and 0.5 parts by mass of an auxiliary crosslinking agent (i2) and were mixed for 30 seconds in a Henshel mixer. Then a two-shaft extruder (trade name PCM-45, manufactured by Ikegai Ltd., with completely meshing screws in a same direction, L/D (ratio of a screw flight length L and screw diameter D)=33.5) was used to execute an extrusion by dynamically heat-treating under conditions of 230° C., 300 rpm and a retention time of 2 minutes, thereby producing an acrylate resin-containing composition [B], which was a pellet-shaped dynamically crosslinked thermoplastic elastomer composition.

[3] Preparation of Test Piece

The pellets of the obtained thermoplastic elastomer were injection molded with an injection molding machine (trade name N-100, manufactured by Japan Steel Work Co.) to obtain a sheet of a thickness of 2 mm, a length of 120 mm and a width of 120 mm, which was used for various evaluations.

[4] Evaluation of the Acrylate Resin-containing Composition [B]
(1) fluidity: a melt flow rate was measured at 230° C. and under a load of 10 kg as an index of fluidity;
(2) hardness: measured according to JIS K 6253 as an index of flexibility;
(3) tensile strength at break and tensile elongation at break: measured according to JIS K 6251;

EXAMPLES 8-10 AND COMPARATIVE EXAMPLES 5-10

The pellet-shaped acrylate resin-containing composition [B] and test pieces were prepared in the same manner as in Example 7, with formulations as shown in Table 2. The result of evaluations of the acrylate resin-containing composition [B] are shown in Table 2.

TABLE 2

|  |  | Example | | | | Comparative Example | | | | | |
| --- | --- | --- | --- | --- | --- | --- | --- | --- | --- | --- | --- |
|  |  | 7 | 8 | 9 | 10 | 5 | 6 | 7 | 8 | 9 | 10 |
| oil-extended EPDM (all) (mineral oil softening agent content 50 mass %) | | 80(40) | 65(32.5) | 70(35) | 60(30) | 70(35) | 85(42.5) | 80(40) | 65(32.5) | 70(35) | 60(30) |
| crystalline olefinic resin | (b13) | 10 | 20 | 10 | 22 | 25 | 13 | 20 | 22 | 22 | 22 |
| amorphous olefinic resin | (b2) | 5 | — | 5 | 3 | 5 | 2 | — | 3 | 3 | 3 |
| (meth)acrylate resin | (c1) | 5 | 10 | 10 | 10 | — | — | — | 10 | — | 10 |
| hydrogenated diene polymer | (d1) | 2 | 5 | 5 | 5 | — | — | — | — | 5 | 5 |
| content (mass %) with sum of rubber, olefinic resin, (meth)acrylate resin and hydrogenated diene polymer taken as 100 mass % | EPDM | 64.5 | 48.1 | 53.8 | 42.9 | 53.8 | 73.9 | 66.7 | 48.1 | 53.8 | 42.9 |
| | total olefinic resin | 24.2 | 29.6 | 23.1 | 35.7 | 46.2 | 26.1 | 33.3 | 37 | 38.5 | 35.7 |
| | (meth)acrylate resin | 8.1 | 14.8 | 15.4 | 14.3 | — | — | — | 14.9 | — | 14.3 |
| | hydrogenated diene polymer | 3.2 | 7.5 | 7.7 | 7.1 | — | — | — | — | 7.7 | 7.1 |
| crosslinking agent | (h1) | 0.5 | 1 | 1 | 1 | 1 | 1 | 1 | 1 | 1 | — |
| auxiliary | (i1) | — | 1.25 | 1.25 | — | 0 | 1.25 | 1.25 | — | — | — |
| crosslinking agent | (i2) | 0.5 | — | — | 0.5 | 0.5 | — | — | 0.5 | 0.5 | — |
| antiaging agent | (j1) | 0.1 | 0.1 | 0.1 | 0.1 | 0.1 | 0.1 | 0.1 | 0.1 | 0.1 | 0.1 |
| silicone oil | (k1) | 0.2 | 0.2 | 0.2 | 0.2 | 1.2 | 0.2 | 0.2 | 0.2 | 0.2 | 0.2 |
| fluidity | MFR(190° C. × 21.1 N) [g/10 min] | 3 | 10 | 4 | 32 | 35 | 2 | 6 | 30 | 39 | 14 |
| mechanical properties | hardness (type A durometer) | 60 | 80 | 68 | 88 | 86 | 60 | 74 | 86 | 82 | 86 |
| | tensile strength at break [MPa] | 6.2 | 7 | 5.4 | 8.5 | 10.3 | 7 | 8.2 | 5.1 | 9.8 | 4.1 |
| | tensile elongation at break (%) | 740 | 650 | 720 | 650 | 760 | 600 | 650 | 660 | 680 | 720 |
| permanent compression set | CS(70° C. × 22 hr)[%] | 45 | 51 | 50 | 61 | 51 | 58 | 40 | 65 | 61 | 90 |
| scratch resistance | ① | 40 | 50 | 40 | 50 | 10 or less | 10 or less | 10 or less | 40 | 10 or less | 10 or less |
| | ② | ○ | ○ | ○ | ○ | X | X | X | ○ | X | X |

Parenthesized number in oil-extended EPDM column indicates EPDM content (parts by mass).

(4) permanent compression set: measured according to JIS K 6262 as an index of rubber elasticity and under conditions of 70° C. and 22 hours;
(5) scratch resistance test 1): A taber scratch tester manufactured by Toyo Seiki Mfg., Co. was used to scan a surface of a molded sheet with a metal craw (of tungsten carbide) under a predetermined load (initially 10 g and stepwise increased by 10 g), and a load causing a scratch was measured. A larger load indicates a better scratch resistance.
(6) scratch resistance test 2): A surface of a molded sheet was scratched with a nail of a thumb, and a level of scratch was visually evaluated.
Criteria of evaluation were ○: no scratch, Δ: slight scratch, X: deep scratch.
The results of these evaluations are shown in Table 2.

(6) Result of Example

Table 2 indicates that Examples 7 to 10 are excellent in the scratch resistance, the mechanical properties and the rubber elasticity. While Comparative Examples 5 to 7 are inferior in the scratch resistance because of absence of (meth)acrylate resin and hydrogenated diene polymer. Also Comparative Example 8 is inferior in the mechanical properties because of absence of hydrogenated diene polymer. Also Comparative Example 9 is inferior in the scratch resistance because of absence of (meth)acrylate resin, and Comparative Example 10 is inferior in the mechanical properties, the rubber elasticity and the scratch resistance because of absence of crosslinking.

3. Maleimide Compound-containing Composition [C]

Rubber, crystalline olefinic resin, amorphous olefinic resin, softening agent, crosslinking agent or the like. employed as raw materials were as follows.

[1] Raw Materials (1) Ethylene•α-olefin Random Copolymer Rubber

An oil-extended ethylene•α-olefin random copolymer containing, in a weight ratio of 50/50, an ethylene/propylene/5-ethylidene-2-norbornene ternary copolymer rubber (a11), ethylene content: 66 weight %, 5-ethylidene-2-norbornene content: 4.5 weight %, a limiting viscosity [η] measured at 135° C. in decaline: 4.7 dl/g, and a mineral oil type softening agent (trade name Diana Process Oil PW-380, manufactured by Idemitsu Kosan Co., Ltd.);

(2) Olefinic Resin

1) Crystalline olefinic resin (b13): a propylene/ethylene random copolymer, density: 0.90 g/cm$^3$, MFR (temperature 230° C., load 2.16 kgs): 23 g/10 minutes, (trade name Novatec PP FL25R, manufactured by Nippon Polychem Co.);

2) Amorphous olefinic resin (b2): a propylene/1-butene amorphous copolymer; propylene content: 71 mol %, melt viscosity: 8 Pa·s, density: 0.87 g/cm$^3$, Mn: 6500, (trade name APAO UT2780, manufactured by Ube Industries Ltd.);

(3) (Meth)acrylate Resin:

a methyl methacrylate/methyl acrylate copolymer (c1); density: 1.19 g/cm$^3$, MFR (temperature 230° C., load 3.8 kgs): 8 g/10 minutes, (trade name Parapet G, manufactured by Kuraray Ltd.);

(4) Hydrogenated Diene Polymer (d1)

A hydrogenated diene polymer was synthesized by a following method. Also measurements were made by following methods:

1) vinyl aromatic compound content: measured by an infrared analysis based on a phenyl group absorption at 679 cm$^{-1}$;

2) vinyl bond content of conjugate diene: calculated by Morello method based on infrared analysis;

3) hydrogenation rate: calculated from $^1$H-NMR spectrum at 90 MHz employing carbon tetrachloride as a solvent;

4) weight average molecular weight: calculated by polystyrene conversion, utilizing gel permeation chromatography (GPC) at 38° C., utilizing tetrahydrofuran as a solvent.

Method of Synthesis of Hydrogenated Diene Polymer

In an autoclave with an internal volume of 5 liters, 2.5 kgs of cyclohexane, 15 g of tetrahydrofuran, 110 g of styrene (block A component), and 0.55 g of n-butyl lithium were charged and polymerized at 50° C. to a conversion yield of 98% or higher. Then 220 g of 1,3-butadiene (block B component) were added and polymerized to a conversion yield of 98% or higher, and 110 g of styrene (block A component) were further added and polymerized to a conversion yield of 100%.

After the completion of the polymerization, the reaction liquid was maintained at 70° C., 0.33 g of n-butyl lithium, 0.61 g of t-hydroxy-4-methyl-2-pentanone, 0.21 g of bis(cyclopentadienyl) titanium dichloride and 0.76 g of diethyl aluminum chloride were added and reacted for 1 hour at a hydrogen pressure of 10 kg/cm$^2$ to achieve hydrogenation. The reaction liquid was charged and mixed in a large amount of methyl alcohol, and a precipitated solid was recovered and dried to obtain a block copolymer. This hydrogenated diene polymer (d1) was of A-B-A type, and had a hydrogenation rate of 95%, a 1,2-vinyl bond content in the butadiene unit of the block B of 80%, a mass ratio of block A/block B of 50/50 and a weight average molecular weight of 100,000.

(5) Crosslinking Agent

1) Organic peroxide (h1): 2,5-dimethyl-2,5-bis(t-butylperoxy)hexane (trade name Perhexa 25B-40, manufactured by NOF Corp.);

2) Auxiliary crosslinking agent (i1): divinylbenzene (purity 55%), (manufactured by Sankyo Kasei Co.);

(6) Maleimide Compound (e1): N,N'-m-phenylenebis Maleimide (Trade Name Vulnoc PM, Manufactured by Ouchishinko Chemical Industries Co., Ltd.)

(7) Other Additives

1) Antiaging agent (j1): trade name Irganox 1010 (manufactured by Ciba Specialty Chemicals Co.);

2) Silicone oil: polydimethylorganosiloxane, trade name SH-200 (viscosity=100 cSt), manufactured by Toray Dow-Corning Silicone Co.

EXAMPLE 11

[2] Production of Maleimide Compound-containing Composition [C]

80 parts by mass of ethylene•α-olefin random copolymer rubber (a11), 15 parts by mass of crystalline olefinic resin (b13), 5 parts by mass of amorphous olefinic resin (b2), 0.5 parts by mass of maleimide compound (e1), and 0.1 parts by mass of antiaging agent (j1) were charged in a dual-arm type pressurized kneader of a volume of 10 liters (manufactured by Moriyama Company Ltd.) heated at 150° C. and kneaded for 20 minutes at 40 rpm. Then the composition in a melting state was pelletized with a feeder-ruder (manufactured by Moriyama Company Ltd.) set at 180° C. and 40 rpm. The obtained pellets were added with 1 part by mass of an organic peroxide (h2) and 0.2 parts by mass of a silicone oil (k1) and were mixed for 30 seconds in a Henshel mixer. Then a two-shaft extruder (trade name PCM-45, manufactured by Ikegai Ltd., with completely meshing screws in a same direction, L/D (ratio of a screw flight length L and screw diameter D)=33.5) was used to execute an extrusion by dynamically heat-treating under conditions of 230° C., 300 rpm and a retention time of 2 minutes, thereby producing a maleimide-containing composition [C], which was a pellet-shaped dynamically crosslinked thermoplastic elastomer composition.

[3] Preparation of Test Piece of Maleimide Compound-containing Composition [C]

Pellets of the obtained maleimide compound-containing composition [C] were injection molded with an injection molding machine (trade name N-100, manufactured by Japan Steel Work Co.) to obtain a sheet of a thickness of 2 mm, a length of 120 mm and a width of 120 mm, which was used for various evaluations.

[4] Evaluation of the Maleimide Compound-containing Composition [C]

(1) fluidity: a melt flow rate was measured at 230° C. and under a load of 10 kg as an index of fluidity;

(2) hardness: measured according to JIS K 6253 as an index of flexibility;

(3) tensile strength at break and tensile elongation at break: measured according to JIS K 6251;

(4) permanent compression set: measured according to JIS K 6262 as an index of rubber elasticity and under conditions of 70° C. and 22 hours;

(5) injection fusibility: A test piece prepared by injection fusing a maleimide compound-containing composition [C] to a test piece of an olefinic vulcanized rubber was bent by 180° at a junction of the maleimide compound-containing composition [C] and the member for adhesion, and a peeling state at the adhering interface after repeating the bending 10 times was observed visually.

Criteria for evaluation were as follows: ◯: no peeling, Δ: partial peeling, X: peeling leading to breaking.

1) Preparation of a Member for Adhesion

A following olefinic vulcanized rubber sheet was prepared as a member for adhesion and used for testing.

In 100 parts by mass of an ethylene/propylene/5-ethylidene-2-norbornene ternary copolymer rubber (ethylene content: 72 mol %, propylene content: 28 mol %, Mooney's viscosity: 92, iodine value: 15, trade name EP 103A, manufactured by JSR Corp.), 145 parts by mass of carbon black (trade name Seast 116, manufactured by Tokai Carbon Co.), 85 parts by mass of a mineral oil type softening agent (g1) (trade name Diana Process Oil PW380, manufactured by Idemitsu Kosan Co., Ltd.), 5 parts by mass of zinc white (manufactured by Sakai Chemical Industry Co.), 1 part by mass of stearic acid (manufactured by Asahi Denka Corp.), 1 part by mass of an auxiliary work agent (trade name Hitanol 1501, manufactured by Hitachi Chemical Co.), 2 parts by mass of a release agent (trade name Structol WB212, manufactured by Syl and Zilaher Co.), and 1 part by mass of a plasticizer (polyethylene glycol) were kneaded in a Banbury mixer of a capacity of 3 liters (manufactured by Kobe Steel Ltd.) under conditions of 50° C., 70 rpm and a time of 2.5 minutes. Thereafter, 10 parts by mass of a dehydrating agent (trade name Vesta PP, manufactured by Inoue Sekkai Kogyo Co.), vulcanization accelerators (M (trade name) by 1 part by mass, PX (trade name) by 1 part by mass, TT (trade name) by 0.5 parts by mass and D (trade name) by 1 part by mass, all manufactured by Ouchishinko Chemical Industries Co., Ltd.) and 2.2 parts by mass of sulfur were added and kneaded at 50° C. with 6-inch open rolls (manufactured by Kansai Roll Co.). The vulcanization was conducted for 10 minutes at 170° C. to obtain an olefinic vulcanized rubber sheet of a square of 120 mm and a thickness of 2 mm. The sheet was punched with a dumbbell cutter into a length of 60 mm and a width of 50 mm to prepare a member for adhesion.

2) Preparation of a Test Piece by Injection Fusion of Thermoplastic Elastomer to Olefinic Vulcanized Rubber In a split mold (having a test piece shape of 120×120×2 mm) of an injection molding machine (type N-100, manufactured by Japan Steel Work Co.), the aforementioned member for adhesion (60×50×2 mm) was placed in advance, and each obtained thermoplastic elastomer composition was injection molded on the member for adhesion to obtain a square plate (120×120×2 mm) in which the thermoplastic elastomer composition and the olefinic vulcanized rubber (member for adhesion) were fused.

(6) scratch resistance tests 1) and 2): Tests were made in the same manner as explained in the foregoing. Criteria for evaluation were also same.

The results of these evaluations are shown in Tables 3 and 4.

EXAMPLES 12-18 AND COMPARATIVE EXAMPLES 11-15

The pellet-shaped maleimide compound-containing compositions [C] and test pieces were prepared in the same manner as in Example 11, with formulations as shown in Tables 3 and 4. The maleimide compound-containing compositions [C] were evaluated in a similar manner. The results of evaluations of the maleimide compound-containing composition [C] are shown in Tables 3 and 4.

TABLE 3

| | | | Example | | | | | Comparative Example | | |
|---|---|---|---|---|---|---|---|---|---|---|
| | | | 11 | 12 | 13 | 14 | 15 | 11 | 12 | 13 |
| formulation | oil-extended EPDM (all) (mineral oil softening agent content 50 mass %) | | 80(40) | 80(40) | 70(35) | 75(37.5) | 65(32.5) | 80(40) | 80(40) | 80(40) |
| | crystalline olefinic resin | (b13) | 15 | 15 | 25 | 20 | 10 | 15 | 15 | 15 |
| | amorphous olefinic resin | (b2) | 5 | 5 | 5 | 5 | 10 | 5 | 5 | 5 |
| | maleimide compound | (e1) | 0.5 | 0.5 | 0.5 | 1 | 0.5 | — | 0.25 | — |
| | maleimide compound content (mass part) with sum of rubber, olefinic resin and softening agent taken as 100 mass parts | | 0.5 | 0.5 | 0.5 | 1 | 0.5 | — | 0.25 | — |
| | post-addition mineral oil softening agent | (g1) | — | — | — | — | 15 | — | — | — |
| | content (mass %) with sum of rubber, olefinic resin, and softening agent taken as 100 mass % | EPDM | 40 | 40 | 35 | 37.5 | 32.5 | 40 | 40 | 40 |
| | | total olefinic resin | 20 | 20 | 30 | 25 | 20 | 20 | 20 | 20 |
| | | mineral oil softening agent | 40 | 40 | 35 | 37.5 | 47.5 | 40 | 40 | 40 |
| | crosslinking agent | (h1) | 1 | 1 | 1 | 1 | 1 | 1 | 1 | 1 |
| | auxiliary crosslinking agent | (h3) | — | — | — | — | — | — | — | 1.25 |
| | antiaging agent | (j1) | 0.1 | 0.1 | 0.1 | 0.1 | 0.1 | 0.1 | 0.1 | 0.1 |
| | silicone oil | (k1) | 0.2 | 0.2 | 0.2 | 0.2 | 0.2 | 0.2 | 0.2 | 0.2 |
| physical properties | fluidity | MFR(230° C. × 5 kg)[g/10 min] | 101 | 106 | 120 | 110 | 102 | 52 | 80 | 42 |
| | mechanical properties | hardness (type A durometer) | 67 | 65 | 8.6 | 78 | 49 | 67 | 68 | 57 |
| | | tensile strength at break [MPa] | 6.5 | 6.2 | 9.7 | 8 | 3.5 | 5 | 6 | 8.8 |
| | | tensile elongation at break (%) | 740 | 570 | 680 | 640 | 660 | 810 | 780 | 720 |
| | permanent compression set | CS(70° C. × 22 hr)[%] | 50 | 47 | 59 | 49 | 61 | 65 | 57 | 45 |
| | injection fusibility | 180° bending peel | ◯ | ◯ | ◯ | ◯ | ◯ | X | X | X |

TABLE 3-continued

|  |  | Example | | | | | Comparative Example | | |
|---|---|---|---|---|---|---|---|---|---|
|  |  | 11 | 12 | 13 | 14 | 15 | 11 | 12 | 13 |
| formulation | oil-extended EPDM (all) (mineral oil softening agent content 50 mass %) | 80(40) | 80(40) | 70(35) | 75(37.5) | 65(32.5) | 80(40) | 80(40) | 80(40) |
|  | [visual inspection] | | | | | | | | |

Parenthesized number in oil-extended EPDM column indicates EPDM content (parts by mass).

TABLE 4

|  |  |  | Example | | | Comp. Example | |
|---|---|---|---|---|---|---|---|
|  |  |  | 16 | 17 | 18 | 14 | 15 |
| formulation | oil-extended EPDM (all) (mineral oil softening agent content 50 mass %) |  | 70(35) | 80(40) | 64(32) | 70(35) | 70(35) |
|  | crystalline olefinic resin | (b13) | 26 | 14 | 32 | 26 | 26 |
|  | amorphous olefinic resin | (b2) | 4 | 6 | 4 | 4 | 4 |
|  | content (mass %) with sum of rubber, olefinic resin, and softening agent taken as 100 mass % | EPDM | 35 | 40 | 32 | 35 | 35 |
|  |  | total olefinic resin | 30 | 20 | 36 | 30 | 30 |
|  |  | mineral oil softening agent | 35 | 40 | 32 | 35 | 35 |
|  | maleimide compound | (e1) | 0.6 | 1.2 | 0.6 | — | — |
|  | maleimide compound content (mass part) with sum of rubber, olefinic resin and softening agent as 100 mass parts |  | 0.6 | 1.2 | 0.6 | — | — |
|  | (meth)acrylate resin | (c1) | 12 | 12 | 12 | 12 | 12 |
|  | (meth)acrylate resin content (mass part) with sum of rubber, olefinic resin and softening agent as 100 mass parts |  | 12 | 12 | 12 | 12 | 12 |
|  | hydrogenated diene polymer | (d1) | 6(0.5) | 6(0.5) | 6(0.5) | 6(0.5) | 6(0.5) |
|  | crosslinking agent | (h1) | 1.2 | 1.2 | 1.2 | — | 1.2 |
|  | auxiliary crosslinking agent | (h3) | — | — | — | — | 1.5 |
|  | antiaging agent | (j1) | 0.12 | 0.12 | 0.12 | 0.12 | 0.12 |
|  | silicone oil | (k1) | 0.24 | 0.24 | 0.24 | 0.24 | 0.24 |
| physical properties | fluidity | MFR(230° C. × 5 kg)[g/10 min] | 35 | 5 | 45 | 3 | 16 |
|  | mechanical properties | hardness (type A durometer) | 88 | 70 | 92 | 89 | 88 |
|  |  | tensile strength at break [MPa] | 7.4 | 5.8 | 8 | 7.2 | 8 |
|  |  | tensile elongation at break (%) | 850 | 730 | 600 | 1120 | 720 |
|  | permanent compression set | CS(70° C. × 22 hr)[%] | 59 | 55 | 66 | 88 | 56 |
|  | injection fusibility | 180° bending peel [visual inspection] | ○ | ○ | ○ | X | X |
|  | scratch resistance (1) |  | 50 | 40 | 50 | 10 or less | 50 |
|  | scratch resistance (2) |  | ○ | ○ | ○ | X | ○ |

Parenthesized number in oil-extended EPDM column indicates EPDM content (parts by mass).
Also parenthesized number in hydrogenated diene polymer column indicates a mass ratio to (meth)acrylate resin.

(6) Result of Example

Table 3 indicates that Examples 11 to 15 are excellent in the mechanical properties, the rubber elasticity and the injection fusibility. Comparative Examples 11 and 12 are inferior in the workability, the mechanical properties, the rubber elasticity and the injection fusibility because the addition amount of the maleimide compound is outside the range of the invention. Comparative Example 13 is inferior in the injection fusibility because of use of an auxiliary crosslinking agent other than the maleimide compound. Also Table 4 indicates that Examples 16 to 18 are excellent in the scratch resistance, the mechanical properties, the rubber elasticity and the injection fusibility. Comparative Example 14 is inferior in the mechanical properties, the rubber elasticity, the scratch resistance and the injection fusibility because of absence of crosslinking. Also Comparative Example 15 is inferior in the injection fusibility because of use of an auxiliary crosslinking agent other than the maleimide compound.

4. Examples on Polysiloxane-containing Composition [D]

Rubber, crystalline olefinic resin, amorphous olefinic resin, softening agent, crosslinking agent or the like. employed as raw materials were as follows.

[1] Raw Materials (1) Oil-extended Rubber 1) oil-extended rubber (a11): an ethylene/propylene/5-ethylidene-2-norbornene ternary copolymer rubber, ethylene content: 66 mass %, 5-ethylidene-2-norbornene content: 4.5 mass %, a limiting viscosity measured at 135° C. in decaline: 4.7 dl/g, a mineral oil type softening agent (trade name Diana Process Oil PW-380, manufactured by Idemitsu Kosan Co., Ltd.) content 50 mass %;

2) oil-extended rubber (a12): an ethylene/propylene/5-ethylidene-2-norbornene ternary copolymer rubber, ethylene content: 66 mass %, 5-ethylidene-2-norbornene content: 4.5 mass %, a limiting viscosity measured at 135° C. in decaline: 3.8 dl/g, a mineral oil type softening agent (trade name Diana Process Oil PW-380, manufactured by Idemitsu Kosan Co., Ltd.) content 40 mass %;

(2) Olefinic Resin 1) propylene/ethylene random copolymer (b3), density: 0.90 g/cm$^3$, MFR (temperature 230° C., load 2.16 kgs): 23 g/10 minutes, (trade name Novatec PP FL25R, manufactured by Nippon Polychem Co.);

2) propylene/1-butene amorphous copolymer (b2); propylene content: 71 mol %, melt viscosity: 8 Pa·s, density: 0.879 g/cm$^3$, Mn: 6500, (trade name APAO UT2780, manufactured by Ube Industries Ltd.);

(3) Undenatured Organopolysiloxane 1) polydimethylsiloxane (f11): viscosity 100 cSt (trade name Silicone Oil SH-200, manufactured by Toray Dow-Corning Silicone Co.);

2) polydimethylsiloxane (f12): viscosity 1,000 cSt (trade name Silicone Oil SH-200, manufactured by Toray Dow-Corning Silicone Co.);

3) polydimethylsiloxane (f13): viscosity 5,000 cSt (trade name Silicone Oil SH-200, manufactured by Toray Dow-Corning Silicone Co.);

4) polydimethylsiloxane (f14): viscosity 12,500 cSt (trade name Silicone Oil SH-200, manufactured by Toray Dow-Corning Silicone Co.);

5) ultra-high molecular weight silicone rubber (f15): viscosity 1,000,000 cSt or higher (trade name BY16-140, manufactured by Toray Dow-Corning Silicone Co.);

(4) Denatured Organopolysiloxane acryl-denatured silicone resin (f2): trade name x-22-8171, manufactured by Shin-Etsu Chemical Co., Ltd.;

(5) Mineral Oil Type Softening Agent (g1): Trade Name Diana Process Oil PW-380, Manufactured by Idemitsu Kosan Co., Ltd.;

(6) Crosslinking Agent and Auxiliary Crosslinking Agent 1) 2,5-dimethyl-2,5-bis(t-butylperoxy)hexane (h1): trade name Perhexa 25B-40, manufactured by NOF Corp.);

2) N,N'-m-phenyleneb is maleimide (h2): trade name Vulnoc PM, manufactured by Ouchishinko Chemical Industries Co., Ltd.)

3) auxiliary crosslinking agent (h3): divinylbenzene (manufactured by Sankyo Kasei Co.);

(6) Antiaging Agent (j1): Trade Name Irganox 1010, Manufactured by Ciba Specialty Chemicals Co.

[2] Production of Polysiloxane-containing Composition [D]

EXAMPLES 19-25 AND COMPARATIVE EXAMPLES 16-20 (PRODUCTION BY CLOSED KNEADER+CONTINUOUS KNEADER)

A raw material composition of a formulation shown in Tables 5 and 6 excluding a crosslinking agent was charged in a pressurized kneader (manufactured by Moriyama Company Ltd.) heated to 150° C., and was kneaded for 15 minutes at 40 rpm until the components were uniformly dispersed. Then the composition in a melting state was pelletized with a feeder-ruder (manufactured by Moriyama Company Ltd.). The obtained pellets were added with a crosslinking agent and an auxiliary crosslinking agent in a formulation shown in Tables 5 and 6 and were mixed for 30 seconds in a Henshel mixer. Then the mixture was supplied by a weight type feeder with a discharge amount of 40 kg/hr to a two-shaft extruder (non-meshing screws in a same direction, L/D=38.5, tradename PCM-45, manufactured by Ikegai Ltd.) and was extruded under dynamically heat-treating at 200° C., a screw revolution of 300 rpm and a retention time of 2 minutes to produce a polysiloxane-containing composition [D], as a dynamically crosslinked thermoplastic elastomer composition.

[3] Evaluation of Polysiloxane-containing Composition [D]

Following items were measured in order to evaluate the obtained polysiloxane-containing compositions [D]:

1) melt flow rate (MFR): measured at 230° C. and a load of 10 kg;

2) hardness, tensile strength at break and tensile elongation at break: measured according to JIS K 6301;

3) permanent compression set: measured according to JIS K 6301, under conditions of 70° C., 22 hours and 25% compression;

4) initial slidability and durable slidability

A reciprocating sliding tester (manufactured by Tosoku Seimitsu Co.) was used, under a load of 233 g/3 cm$^2$ (planar pressure 78 g/cm$^2$) and a sliding speed of a glass ring test piece of 100 mm/min (with a stroke of 50 mm) to measure a static friction coefficient and a dynamic friction coefficient of a test piece (length 110 mm, width 61 mm and thickness 2 mm) of the polysiloxane-containing compositions [D] to a cylindrical glass ring test piece of an external diameter of 25.7 mm, an internal diameter of 20 mm, a height of 16.5 mm and a weight of 9.6 g. An initial slidability was measured at the room temperature on a test piece after 1 day from injection molding. Also a durable slidability was measured at the room temperature on a test piece which was let to stand in a gear oven of 100° C. for 500 hours after injection molding.

5) bleeding test: A test piece constituted of the polysiloxane-containing composition [D] was let to stand for 120 hours in a gear oven (manufactured by Toyo Seiki Co.) of 100° C., and a surface state of the test piece was visually observed.

6) Extrusion workability: A laboplast mill extruder (manufactured by Toyo Seiki Co., external diameter=20 mm, L/D=25) was used to extrude a slab (lipwidth: 25 mm, thickness: 1.5 mm) in the following conditions and an external appearance was visually evaluated. A case with a smooth surface and an edge was evaluated as "○", and any other case was evaluated as "X":

cylinder C1=180° C., cylinder C2=190° C., cylinder C3=210° C., die=205° C., screw revolution=40 rpm.

7) Injection fusibility: A test piece prepared by injection fusing a polysiloxane-containing composition [D] was bent by 180° at a junction of the polysiloxane-containing composition [D] and a member for adhesion, and a peeling state at the adhering interface was observed visually.

Criteria for evaluation were as follows: ○: no peeling, Δ: partial peeling, X: peeling leading to breaking.

For the aforementioned evaluations 2) to 5), a test piece of a size of 120×120×2 mm was prepared by injection molding the polysiloxane-containing composition [D] by an injection molder (trade name: N-100, manufactured by Japan Steel Work Co.).

[4] Preparation of a Member for Adhesion

For the aforementioned 7), a member for adhesion of an olefinic vulcanized rubber was prepared in the following manner and used for testing.

In 100 parts by mass of an ethylene/propylene/5-ethylidene-2-norbornene ternary copolymer rubber (ethylene content: 72 mol %, propylene content: 28 mol %, Mooney's viscosity: 92, iodine value: 15, trade name EP 103A, manufactured by JSR Corp.), 145 parts by mass of carbon black (trade name Seast 116, manufactured by Tokai Carbon Co.), 85 parts by mass of a mineral oil type softening agent (g1) (trade name Diana Process Oil PW380, manufactured by Idemitsu Kosan Co., Ltd.), 5 parts by mass of zinc white (manufactured by Sakai Chemical Industry Co.), 1 part by mass of stearic acid (manufactured by Asahi Denka Corp.), 1 part by mass of an auxiliary work agent (trade name Hitanol 1501, manufactured by Hitachi Chemical Co.), 2 parts by mass of a release agent (trade name Structol WB212, manufactured by Syl and Zilaher Co.), and 1 part by mass of a plasticizer (polyethylene glycol) were blended to obtain a mixture.

Then the mixture was kneaded in a Banbury mixer under conditions of 50° C., 70 rpm and a time of 2.5 minutes. Thereafter, 10 parts by mass of a dehydrating agent (trade name Vesta PP, manufactured by Inoue Sekkai Kogyo Co.), vulcanization accelerators (M (trade name) by 1 part by mass, PX (trade name) by 1 part by mass, TT (trade name) by 0.5 parts by mass and D (trade name) by 1 part by mass, all manufactured by Ouchishinko Chemical Industries Co., Ltd.) and 2.2 parts of sulfur were added and kneaded at 50° C. with open rolls. Then a vulcanization was conducted for 10 minutes at 170° C. to obtain an olefinic vulcanized rubber sheet of a square of 120 mm and a thickness of 2 mm. The sheet was punched with a dumbbell cutter into a length of 60 mm and a width of 50 mm to prepare a member for adhesion.

[5] Preparation of a Test Piece by Injection Fusion of Thermoplastic Elastomer to Olefinic Vulcanized Rubber In a split mold (having a test piece shape of 120×120×2 mm) of an injection molding machine (type N-100, manufactured by Japan Steel Work Co.), the aforementioned member for adhesion (60×50×2 mm) was placed in advance, and each obtained thermoplastic elastomer composition was injection molded on the member for adhesion to obtain a square plate (120×120×2 mm) in which the thermoplastic elastomer composition and the olefinic vulcanized rubber were fused.

The results of these evaluations are shown in Tables 5 and 6.

TABLE 5

| oil-extended rubber | limiting viscosity (dl/g) | mineral oil type softening agent content (mass %) | Example 19 | 20 | 21 | 22 | 23 | 24 | 25 |
|---|---|---|---|---|---|---|---|---|---|
| oil-extended EPDM (a11) | 4.7 | 50 | 30 | 32.5 | 40 | 70 | 70 | 70 | 70 |
| oil-extended EPDM (a12) | 3.8 | 40 | 30 | 32.5 | 40 | — | — | — | — |
| content (mass %) with sum of EPDM and softening agent in oil-extended rubber as 100 mass % | | EPDM | 45 | 45 | 55 | 50 | 50 | 50 | 50 |
| | | mineral oil softening agent | 55 | 55 | 45 | 50 | 30 | 50 | 50 |
| | crystalline olefinic resin (b13) | | 5 | 5 | 7.5 | 25 | 25 | 30 | 30 |
| | amorphous olefinic resin (b2) | | 5 | 5 | 7.5 | 5 | 5 | — | — |
| | post-addition mineral oil softening agent (g1) | | 25 | 15 | 5 | — | — | — | — |
| content (mass part) with sum of oil-extended rubber, olefinic resin and post-addition softening agent as 100 mass parts | | oil-extended EPDM | 63.2 | 72.2 | 80 | 70 | 70 | 70 | 70 |
| | | total olefinic resins | 10.5 | 11.1 | 15 | 30 | 30 | 30 | 30 |
| | | post-addition softening agent | 26.3 | 16.7 | 5 | — | — | — | — |
| low-viscosity undenatured organopolysiloxane | viscosity 100 cSt (f11) | | — | — | — | — | 0.5 | — | 0.5 |
| | viscosity 1,000 cSt (f12) | | — | 3 | 3 | 1.5 | — | 1.5 | — |
| | viscosity 5,000 cSt (f13) | | 1.5 | — | — | — | — | — | — |
| high-viscosity undenatured organopolysiloxane | viscosity 12,500 cSt (f14) | | 1.5 | 3 | 3 | 1.5 | — | 1.5 | — |
| | viscosity 1,000,000 cSt (f15) | | — | — | — | — | 2.5 | — | 2.5 |
| | acryl-denatured organopolysiloxane (f2) | | 1 | 1 | 1 | 1 | 0.5 | 1 | 0.5 |
| content (mass part) with sum of oil-extended rubber, olefinic resin and post-addition softening agent as 100 mass parts | low-viscosity undenatured organopolysiloxane | | 1.6 | 3.7 | 3 | 1.5 | 0.5 | 1.5 | 0.5 |
| | high-viscosity undenatured organopolysiloxane | | 1.6 | 3.7 | 3 | 1.5 | 2.5 | 1.5 | 2.5 |
| | acryl-denatured organopolysiloxane | | 1.1 | 1.1 | 1 | 1 | 0.5 | 1 | 0.5 |
| | crosslinking agent (h1) | | 1 | 1 | 1 | 0.5 | 0.5 | 0.5 | 0.5 |
| | crosslinking agent (h2) | | — | — | — | 1 | 1 | 1 | 1 |
| | auxiliary crosslinking agent (h3) | | 1.3 | 1.3 | 1.3 | — | — | — | — |
| | antiaging agent (j1) | | 0.1 | 0.1 | 0.1 | 0.1 | 0.1 | 0.1 | 0.1 |
| | MFR (g/10 min) | | 330 | 520 | 280 | 300 | 285 | 285 | 270 |
| | Hardness [JIS-A hardness] | | 42 | 41 | 51 | 85 | 87 | 87 | 87 |
| | tensile strength at break (MPa) | | 3.9 | 3.7 | 4.6 | 10 | 9.8 | 9.8 | 10.1 |
| | tensile elongation at break (%) | | 800 | 770 | 760 | 740 | 710 | 710 | 720 |
| | permanent compression set (%) | | 42 | 43 | 46 | 59 | 60 | 60 | 60 |
| initial slidability | static friction coefficient | | 0.61 | 0.45 | 0.32 | 0.29 | 0.3 | 0.45 | 0.31 |
| | dynamic friction coefficient | | 0.63 | 0.38 | 0.29 | 0.25 | 0.26 | 0.34 | 0.28 |
| durable slidability | static friction coefficient | | 0.57 | 0.52 | 0.62 | 0.3 | 0.35 | 0.52 | 0.36 |
| | dynamic friction coefficient | | 0.57 | 0.35 | 0.25 | 0.28 | 0.3 | 0.43 | 0.32 |
| | bleeding test (○: absent, X: present) | | ○ | ○ | ○ | ○ | ○ | ○ | ○ |
| | extrusion workability | | ○ | ○ | ○ | ○ | ○ | ○ | ○ |
| | injection fusibility | | ○ | ○ | ○ | ○ | ○ | ○ | ○ |

TABLE 6

| oil-extended rubber | limiting viscosity (dl/g) | mineral oil type softening agent content (mass %) | Comparative Example 16 | 17 | 18 | 19 | 20 |
|---|---|---|---|---|---|---|---|
| oil-extended EPDM (a11) | 4.7 | 50 | 32.5 | 32.5 | 32.5 | 32.5 | 32.5 |
| oil-extended EPDM (a12) | 3.8 | 40 | 32.5 | 32.5 | 32.5 | 32.5 | 32.5 |
| content (mass %) with sum of EPDM and softening agent in oil-extended rubber as 100 mass % | | EPDM | 45 | 45 | 45 | 45 | 45 |
| | | mineral oil softening agent | 55 | 55 | 55 | 55 | 55 |
| | crystalline olefinic resin (b13) | | 5 | 5 | 5 | 5 | 5 |
| | amorphous olefinic resin (b2) | | 5 | 5 | 5 | 5 | 5 |
| | post-addition mineral oil softening agent (g1) | | 15 | 15 | 15 | 15 | 15 |
| content (mass part) with sum of oil-extended rubber, olefinic resin and post-addition softening agent as 100 mass parts | | oil-extended EPDM | 72.2 | 72.2 | 72.2 | 72.2 | 72.2 |
| | | total olefinic resins | 11.1 | 11.1 | 11.1 | 11.1 | 11.1 |
| | | post-addition softening agent | 16.7 | 16.7 | 16.7 | 16.7 | 16.7 |
| low-viscosity undenatured organopolysiloxane | viscosity 100 cSt (f11) | | 3 | — | — | — | — |
| | viscosity 1,000 cSt (f12) | | — | 3 | — | — | 3 |
| | viscosity 5,000 cSt (f13) | | — | — | 3 | — | — |
| high-viscosity undenatured organopolysiloxane | viscosity 12,500 cSt (f14) | | — | — | — | 3 | 3 |
| | viscosity 1,000,000 cSt (f15) | | — | — | — | — | — |
| | acryl-denatured organopolysiloxane (f2) | | — | — | — | — | — |
| content (mass part) with sum of oil-extended rubber, olefinic resin and post-addition softening agent as 100 mass parts | low-viscosity undenatured organopolysiloxane | | 3.3 | 3.3 | 3.3 | — | 3.3 |
| | high-viscosity udenatured organopolysiloxane | | — | — | — | 3.3 | 3.3 |
| | acryl-denatured organopolysiloxane | | — | — | — | — | — |
| | crosslinking agent (h1) | | 1 | 1 | 1 | 1 | 1 |
| | crosslinking agent (h2) | | — | — | — | — | — |
| | auxiliary crosslinking agent (h3) | | 1.3 | 1.3 | 1.3 | 1.3 | 1.3 |
| | antiaging agent (j1) | | 0.1 | 0.1 | 0.1 | 0.1 | 0.1 |
| | MFR (g/10 min) | | 200 | 130 | 290 | 250 | 280 |
| | Hardness [JIS-A hardness] | | 43 | 43 | 42 | 42 | 42 |
| | tensile strength at break (MPa) | | 4 | 3.9 | 4.2 | 4.1 | 3.7 |
| | tensile elongation at break (%) | | 760 | 760 | 780 | 770 | 680 |
| | permanent compression set (%) | | 39 | 40 | 43 | 45 | 43 |
| initial slidability | static friction coefficient | | 0.55 | 0.81 | 0.93 | 0.97 | 0.6 |
| | dynamic friction coefficient | | 0.53 | 0.67 | 0.72 | 0.7 | 0.59 |
| durable slidability | static friction coefficient | | 1.5 | 1.48 | 1.16 | 0.88 | 1.25 |
| | dynamic friction coefficient | | 1.1 | 1 | 0.73 | 0.69 | 1.1 |
| | bleeding test (○: absent, X: present) | | X | X | X | ○ | X |
| | extrusion workability | | ○ | ○ | ○ | ○ | X |
| | injection fusibility | | ○ | ○ | ○ | ○ | X |

(6) Result of Example

According to Tables 5 and 6, Comparative Examples 16 to 18 employed a low-viscosity undenatured organopolysiloxane only and did not employ an acryl-denatured organopolysiloxane. For this reason, they were excellent in the extrusion workability and the injection fusibility, but were inferior in the initial and durable slidability, and a bleeding was confirmed. A comparative Example 19 employed a high-viscosity undenatured organopolysiloxane only but did not employ an acryl-denatured organopolysiloxane. For this reason, it was excellent in the extrusion workability and the injection fusibility, but was inferior in the initial and durable slidability. Also a comparative Example 20 employed high-viscosity and low-viscosity undenatured organopolysiloxanes but did not employ an acryl-denatured organopolysiloxane. For this reason, it was inferior in the initial and durable slidability, the extrusion workability and the injection fusibility, and a bleeding was also confirmed. On the other hand, polysiloxane-containing compositions [D] of Examples 19 to 25 were excellent in the initial and durable slidability and the extrusion workability, and did not show the bleeding of organopolysiloxane. Also there were not observed a peeling or a breakage, and an excelleng injection fusibility was identified.

The invention claimed is:

1. A thermoplastic elastomer composition prepared by a process which comprises:
    dynamically heat treating, in the presence of a crosslinking agent, a polymer composition comprising
    a rubber,
    an olefinic resin mixture comprising at least one crystalline olefinic resin and at least one amorphous olefinic resin,
    a softening agent,
    a (meth)acrylate resin, and
    a maleimide compound, wherein for the sum of said rubber, said olefinic resin mixture and said softening agent taken as 100 parts by mass, said maleimide compound is present at a level of 0.3 to 10 parts by mass and said (meth)acrylate resin is present at a level of 1 to 30 parts by mass.

2. The thermoplastic elastomer composition according to claim 1, wherein said polymer composition further comprises a hydrogenated diene polymer, wherein said hydrogenated diene polymer is present at a level of 0.1 to 1 in a mass ratio to said (meth)acrylate resin.

3. The thermoplastic elastomer composition according to claim 1, wherein the at least one crystalline olefinic resin comprises an $\alpha$-olefin as a principal constituent unit in an amount of 80 mol % or more, based on total crystalline olefinic resin.

4. The thermoplastic elastomer composition according to claim 1, wherein the at least one crystalline olefinic resin has a crystallinity of 50% or higher, as measured by X-ray diffraction.

5. The thermoplastic elastomer composition according to claim 1, wherein the at least one amorphous olefinic resin comprises an $\alpha$-olefin as a principal constituent unit in an amount of 50 mol % or more, based on total amorphous olefinic resin.

* * * * *